US012572222B2

(12) United States Patent
Harmon et al.

(10) Patent No.: US 12,572,222 B2
(45) Date of Patent: Mar. 10, 2026

(54) MODULAR VEHICLE HMI

(71) Applicant: FORD GLOBAL TECHNOLOGIES, LLC, Dearborn, MI (US)

(72) Inventors: Michael John Harmon, Northville, MI (US); Douglas Field, Dearborn, MI (US); Alan Clarke, Long Beach, CA (US); Daniel Smith, Rolling Hills Estates, CA (US); Henry D. Bernardo, Southfield, MI (US); Raul Cenan, Marina Del Rey, CA (US); Minsung Kim, Irvine, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 18/765,651

(22) Filed: Jul. 8, 2024

(65) Prior Publication Data

US 2024/0361844 A1      Oct. 31, 2024

Related U.S. Application Data

(63) Continuation of application No. 18/166,296, filed on Feb. 8, 2023, now Pat. No. 12,061,750.

(51) Int. Cl.
G06F 3/02          (2006.01)
B60K 35/10          (2024.01)
(Continued)

(52) U.S. Cl.
CPC ............ G06F 3/0227 (2013.01); B60K 35/10 (2024.01); G06F 3/0202 (2013.01);
(Continued)

(58) Field of Classification Search
CPC .... G06F 3/0227; G06F 3/0202; G06F 3/0362; G06F 3/0482; G06F 3/04847;
(Continued)

(56) References Cited

U.S. PATENT DOCUMENTS

| | | | |
|---|---|---|---|
| 1,620,715 A | 3/1927 | Bergeim | |
| 4,329,673 A | 5/1982 | Uchikune et al. | |

(Continued)

OTHER PUBLICATIONS

Ohwamo et al., "Mobile Button for My Car", https://community.hubitat.com/t/mobil-button-for-my-car/52735, Oct. 2020, 6 pages.

*Primary Examiner* — Mihir K Rayan

(74) *Attorney, Agent, or Firm* — Joseph Zane; Brooks Kushman P.C.

(57) ABSTRACT

A vehicle system is provided for a modular human-machine interface (HMI). The system includes a configurable display of a vehicle; and an HMI display system of the vehicle, in communication with the configurable display. The HMI display system is configured to, responsive to detection of presence of a modular programmable widget having one or more physical controls, present a user interface to the configurable display for the configuration of the one or more physical controls of the modular programmable widget, receive, via the user interface, input assigning functions to the one or more physical controls, save the function assignment to display settings of the HMI display system, and in a runtime mode, perform an assigned function responsive to user input to the one or more physical controls.

17 Claims, 23 Drawing Sheets

(51) Int. Cl.

| | |
|---|---|
| *G06F 3/0362* | (2013.01) |
| *G06F 3/0482* | (2013.01) |
| *G06F 3/04847* | (2022.01) |
| *G06F 3/0488* | (2022.01) |

(52) U.S. Cl.
CPC .......... *G06F 3/0362* (2013.01); *G06F 3/0482* (2013.01); *G06F 3/04847* (2013.01); *G06F 3/0488* (2013.01); *B60K 2360/126* (2024.01); *B60K 2360/131* (2024.01)

(58) Field of Classification Search
CPC ... G06F 3/0488; B60K 37/06; B60K 2370/12; B60K 2370/131
See application file for complete search history.

(56) References Cited

U.S. PATENT DOCUMENTS

| | | | |
|---|---|---|---|
| 7,758,424 | B2 | 7/2010 | Riggs et al. |
| 8,241,126 | B2 | 8/2012 | Ambinder et al. |
| 8,711,095 | B2 | 4/2014 | Tan et al. |
| 8,964,379 | B2 | 2/2015 | Rihn et al. |
| 8,972,617 | B2 * | 3/2015 | Hirschman ............. G06F 3/023 463/37 |
| 9,214,773 | B2 | 12/2015 | Misener |
| 9,429,994 | B1 * | 8/2016 | Vier ...................... G06F 1/1632 |
| 9,529,447 | B2 | 12/2016 | Hodges et al. |
| 9,658,751 | B2 | 5/2017 | Han |
| 10,092,828 | B1 | 10/2018 | Lotzer |
| 10,114,425 | B2 * | 10/2018 | Lam ...................... G06F 1/1681 |
| 10,120,420 | B2 | 11/2018 | Bathiche et al. |
| 10,610,776 | B2 | 4/2020 | Iwao et al. |
| 10,705,629 | B1 * | 7/2020 | Arnold ................ G06F 3/03547 |
| 10,836,348 | B1 | 11/2020 | Papworth et al. |
| 10,945,476 | B2 * | 3/2021 | Huang ............... A44B 11/2588 |
| 10,970,998 | B1 | 4/2021 | Lange et al. |
| 11,084,379 | B2 | 8/2021 | Sung et al. |
| 11,646,559 | B2 | 5/2023 | Misener et al. |
| 12,061,750 | B1 * | 8/2024 | Harmon ................. B60K 35/00 |
| 2008/0238879 | A1 * | 10/2008 | Jaeger ................... G06F 3/0338 345/173 |
| 2008/0290667 | A1 | 11/2008 | Hsu |
| 2009/0161303 | A1 | 6/2009 | Hirota |
| 2011/0316655 | A1 | 12/2011 | Mehraban et al. |
| 2012/0271967 | A1 | 10/2012 | Hirschman |
| 2014/0266635 | A1 | 9/2014 | Roth et al. |
| 2015/0054646 | A1 | 2/2015 | Yuki |
| 2015/0279535 | A1 | 10/2015 | Arrington et al. |
| 2015/0293509 | A1 | 10/2015 | Bankowski et al. |
| 2017/0183033 | A1 | 6/2017 | Jaramillo-Moscoso |
| 2018/0181359 | A1 | 6/2018 | Monroe et al. |
| 2018/0270063 | A1 | 9/2018 | Bard et al. |
| 2018/0341340 | A1 | 11/2018 | Larkin |
| 2018/0373350 | A1 * | 12/2018 | Rao .......................... G06F 3/016 |
| 2019/0014200 | A1 | 1/2019 | Cho et al. |
| 2019/0248298 | A1 | 8/2019 | Barnes et al. |
| 2020/0014161 | A1 | 1/2020 | Liao |
| 2020/0189392 | A1 * | 6/2020 | Sung ......................... H01F 7/20 |
| 2020/0247328 | A1 | 8/2020 | Almahmoud et al. |
| 2021/0019278 | A1 | 1/2021 | Hulbert et al. |
| 2021/0053512 | A1 | 2/2021 | Perona et al. |
| 2021/0055806 | A1 * | 2/2021 | Shepelev ............... B60K 35/10 |
| 2021/0245601 | A1 | 8/2021 | Giraud et al. |
| 2022/0134884 | A1 * | 5/2022 | Chung .................. H04W 76/10 345/184 |
| 2022/0239124 | A1 | 7/2022 | Aurongzeb et al. |
| 2023/0390634 | A1 | 12/2023 | Lu et al. |
| 2024/0199288 | A1 | 6/2024 | Taylor et al. |

* cited by examiner

1100A

114

1100B

114

1102

1104

1100C

114

1102

1104

1100D

114

1102

1104

MODULAR VEHICLE HMI

CROSS-REFERENCE TO RELATED APPLICATIONS

This application is a continuation of U.S. application Ser. No. 18/166,296 filed Feb. 8, 2023, now issued as U.S. Pat. No. 12,061,750 on Aug. 13, 2024, the disclosure of which is hereby incorporated in its entirety by reference herein.

TECHNICAL FIELD

Aspects of the disclosure generally relate to modular human-machine interfaces (HMIs) for vehicles.

BACKGROUND

Many modern vehicles are equipped with electronic displays. Sometimes referred to as a digital dash, an electronic gauge cluster includes a set of vehicle instrumentation that may be displayed with a configurable digital readout or display panel, rather than with traditional analog gauges. Due to the configurable nature of the digital displays, electronic gauge cluster may be controlled by the user to display different elements of vehicle information.

SUMMARY

In one or more illustrative embodiments, a vehicle system is provided for a modular HMI. The system includes a configurable display of a vehicle; and an HMI display system of the vehicle, in communication with the configurable display. The HMI display system is configured to, responsive to detection of presence of a modular programmable widget having one or more physical controls, present a user interface to the configurable display for the configuration of the one or more physical controls of the modular programmable widget, receive, via the user interface, input assigning functions to the one or more physical controls, save the function assignment to display settings of the HMI display system, and in a runtime mode, perform an assigned function responsive to user input to the one or more physical controls.

In one or more illustrative embodiments, a modular programmable widget is provided. The modular programmable widget includes a front panel, a top panel, and a rear panel defining a generally rectangular enclosure body. The modular programmable widget further includes one or more physical controls extending outwards from the front panel of the body, and first and second electrical connectors, extending upwards from the top panel, the first and second electrical connectors being spaced apart to facilitate connection with corresponding electrical connectors of a configurable display.

In one or more illustrative embodiments, a modular programmable widget system for a vehicle is provided. The system includes a configurable display. The system further includes a modular programmable widget comprising a front panel defining one or more physical controls, and an enclosure, defining side and rear walls of a right rectangular prism shape. The system further includes an HMI display system, in communication with the configurable display, configured to in a configuration mode, present a user interface to the configurable display for the configuration of the one or more physical controls of the modular programmable widget, and in a runtime mode, perform an assigned function responsive to user input to the one or more physical controls.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Some vehicle HMIs provide a primarily touch based interface, with few physical controls. Such an interior may offer simplicity and minimalism. Yet, some users may desire tactile controls. Each user may have different preferences, and the ability to tailor the user interface may be a user expectation.

An enhanced vehicle HMI may support modular programmable widgets. These widgets may include a variety of modular and programmable tactile buttons, knobs, switches, or other physical controls. The modular programmable widgets may be installed to the vehicle and assigned to various functions. Once attached and configured, the physical controls of the modular programmable widgets may offer quick, customized access to the configured functions. Further aspects of the modular programmable widgets are described in detail herein.

Figure 1:
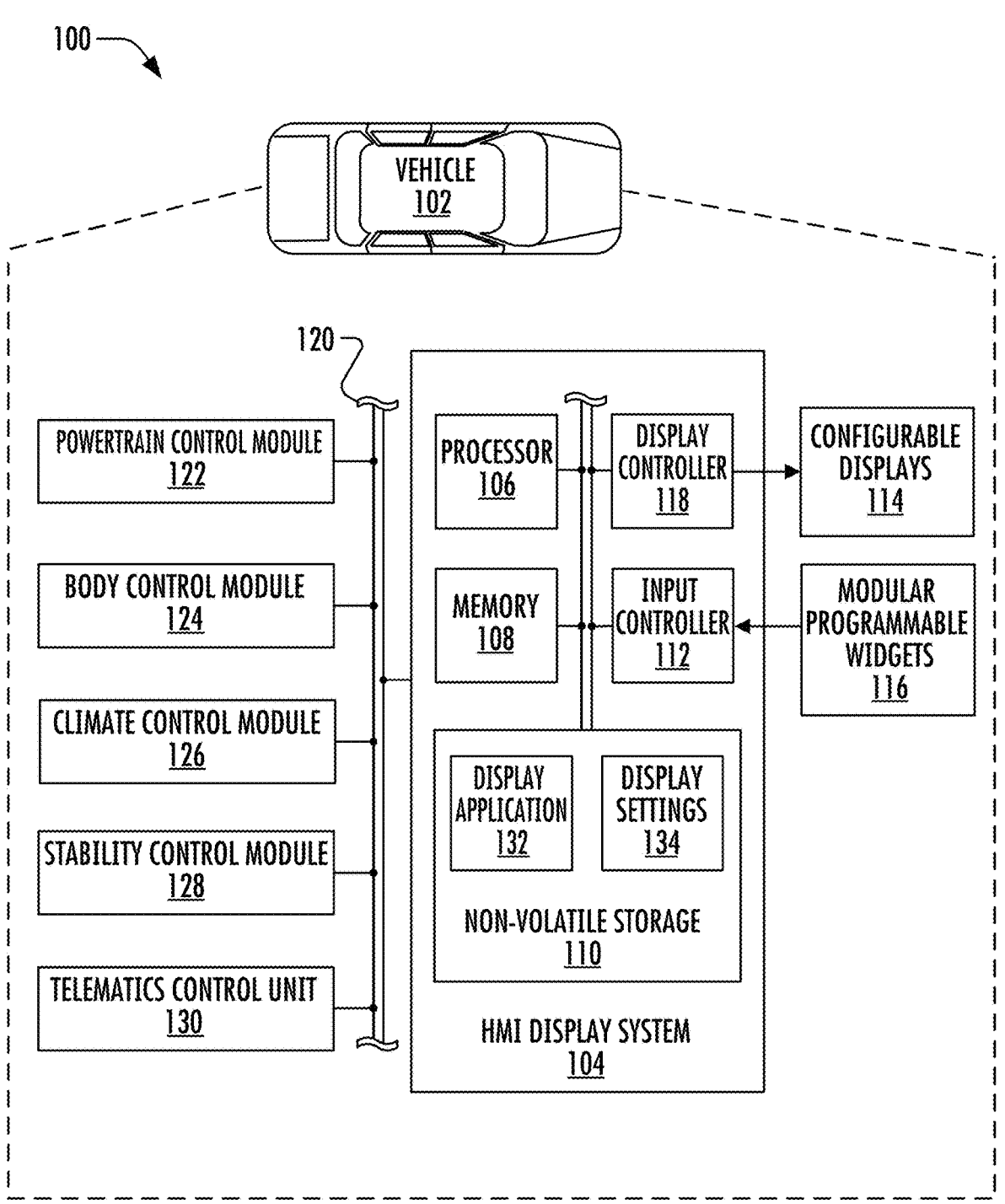
FIG. 1 illustrates an example block diagram of a vehicle supporting modular programmable widgets.

FIG. 1 illustrates an example block diagram 100 of a vehicle 102 supporting modular programmable widgets 116. The vehicle 102 may include various types of passenger vehicle, such as crossover utility vehicle (CUV), sport utility vehicle (SUV), truck, recreational vehicle (RV), boat, plane or other mobile machine for transporting people or goods. It should be noted that the illustrated vehicle 102 is merely an example, and more, fewer, and/or differently located elements may be used.

An HMI display system 104 of the vehicle 102 may include one or more processors 106 configured to perform instructions, commands and other routines in support of the processes described herein. For instance, the HMI display system 104 may be configured to execute instructions of a display application 132 loaded to a memory 108 to provide information display features. Such instructions and other data may be maintained in a non-volatile manner using a variety of types of computer-readable medium 110. The computer-readable medium 110 (also referred to as a processor-readable medium or storage) includes any non-transitory medium (e.g., a tangible medium) that participates in providing instructions or other data that may be read by the processor 106 of the HMI display system 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, hypertext markup language (HTML), etc.

The HMI display system 104 may be provided with various functionality to allow the occupants to interact with the vehicle 102. For example, the HMI display system 104 may drive or otherwise communicate with one or more configurable displays 114 configured to provide visual output to vehicle 102 occupants and receive touch input from the occupants by way of a display controller 118. In another example, the HMI display system 104 may include an input controller 112 configured to receive user input indicative of occupant-vehicle interaction from one or more modular programmable widgets 116 of the vehicle 102. These modular programmable widgets 116 may include various controls, such as buttons or knobs.

Figure 2:
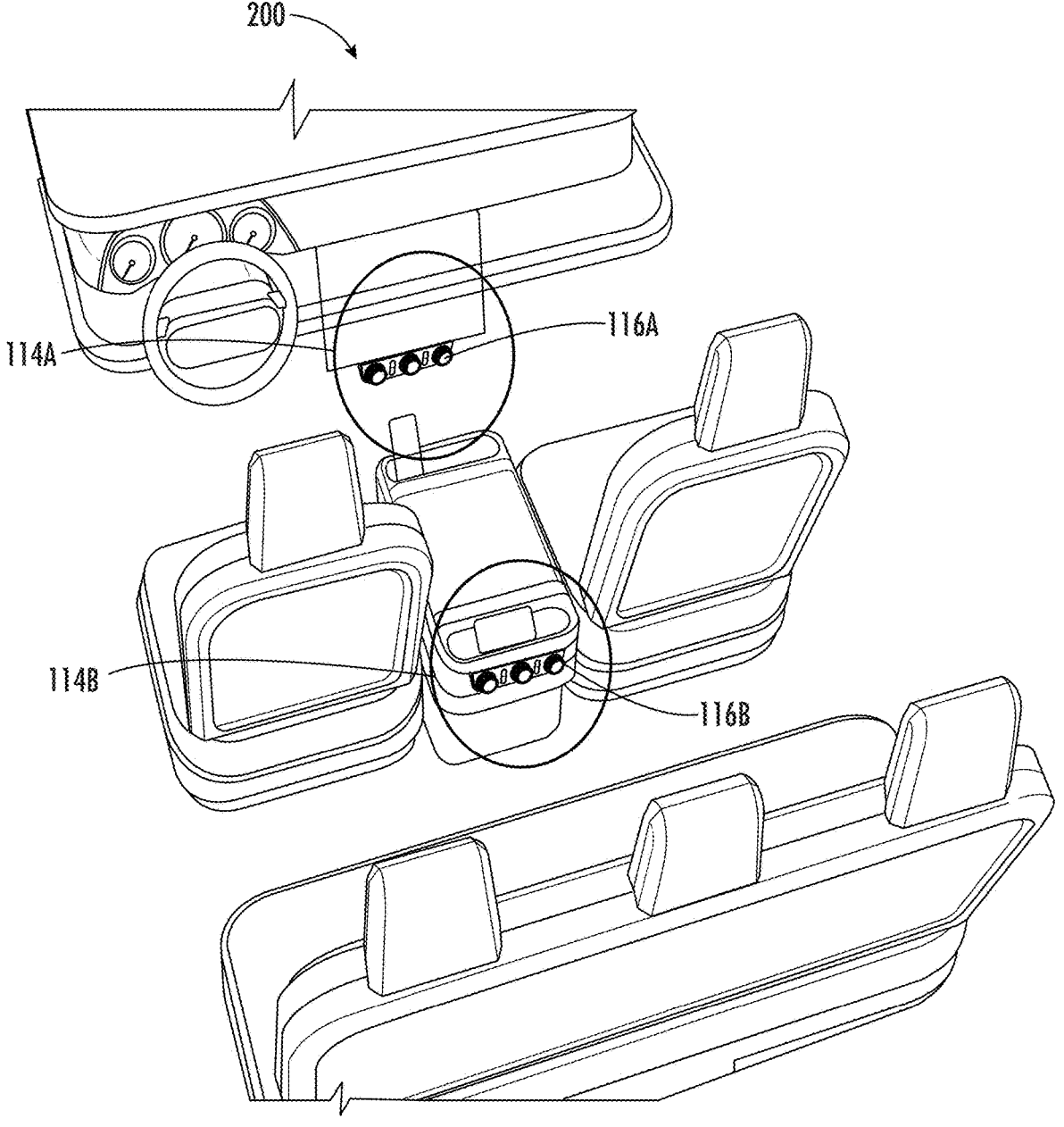
FIG. 2 illustrates an example cutaway view of a vehicle interior supporting the modular programmable widgets.

FIG. 2 illustrates an example cutaway view of a vehicle interior 200 supporting the modular programmable widgets 116. As shown in FIG. 2, the HMI display system 104 for the vehicle 102 may provide a touch-based user interface via one or more configurable displays 114. To satisfy the requirements to users who wish to use hardware controls, the HMI display system 104 may provide an ability to add, remove, and configure the modular programmable widgets 116 using the configurable display 114. The modular programmable widgets 116 may offer customizable tactile HMI for various vehicle 102 functions. The controls may be assigned to various functions such as bringing up a bookmarked display screen, or allowing for the direct configuration of settings such as utility controls (e.g., towing functions), climate controls, gig work function (e.g., rideshare), media control functions, smart home settings, vehicle settings, etc.

As shown, a first modular programmable widget 116A is attached to a center stack display 114A. This location under the center stack display 114A may be easily accessible for driver and passenger. Also shown, a second modular programmable widget 116B is attached to a second row display 114B. Here, the second modular programmable widget 116B is attached to the console for access by rear passengers, which may be useful for both retail and vehicle-as-a-service (VaaS) use cases. It should also be noted that the illustrated vehicle interior 200 is an example, and interiors having more, fewer, or differently located components may be used.

Referring back to FIG. 1, the HMI display system 104 may be further configured to communicate with other components of the vehicle 102 via one or more in-vehicle buses 120. The in-vehicle buses 120 may include one or more of a vehicle controller area network (CAN), an Ethernet network, and a media oriented system transfer (MOST), as some non-limiting possibilities. The in-vehicle buses 120 may allow the HMI display system 104 to send or receive information relevant to the HMI to and from other vehicle 102 systems. The exemplary vehicle systems discussed herein may communicate with the HMI display system 104 over a main in-vehicle bus 120. In other examples, the HMI display system 104 may be connected to more or fewer in-vehicle buses 120, and one or more modular program-mable widgets 116 or other components may be connected to the HMI display system 104 via in-vehicle buses 120 or directly without connection to an in-vehicle bus 120.

As some non-limiting examples, a powertrain control module 122 may be a component in communication with the HMI display system 104 and may be configured to provide information to the HMI display system 104 regarding control of engine operating components (e.g., idle control, fuel delivery, emissions control, engine diagnostic codes, etc.). A body control module 124 may be configured to manage various power control functions such as exterior lighting, interior lighting, keyless entry, remote start, and provide information to the HMI display system 104 such as point of access status information (e.g., closure status of the hood, doors and/or trunk of the vehicle 102). A climate control module 126 may be configured to provide control and monitoring of heating and cooling system components, as well as to provide information to the HMI display system 104 regarding the components (e.g., compressor clutch and blower fan control, temperature sensor information, etc.). A stability control module 128 may be configured to perform functions such as active suspension control, traction control, and brake control, and provide sensed vehicle 102 dynamics information to the HMI display system 104, such as roll angle, pitch angle, yaw rate, roll rate, pitch rate, lateral and longitudinal velocity, lateral and longitudinal change over time, tire slip, tire slip rate, and an infotainment system module. A telematics control module 130 may include an in-vehicle modem configured to access communications services of a communications network (not shown), and may provide packet-switched network services (e.g., Internet access, voice over Internet protocol (VOIP) communication services) to the HMI display system 104 and to other devices connected over the in-vehicle bus 120.

A display application 132 may be installed to the HMI display system 104 and utilized to allow the vehicle 102 to provide output to the display controller 118 such that the configurable display 114 conveys the information relating to the operation of the vehicle 102 to the driver. In an example, the display application 132 may be configured to provide a menu structure via the configurable display 114 having set of categories into which information screens are placed, such as media selections, trip/fuel information, navigation, tow-ing information, etc.

The menu structure may further include information screens that may be selected from the categories. For instance, the trip/fuel category may include a trip counter screen for a first trip counter, a trip counter screen for a second trip counter, a fuel economy screen, a fuel history screen, and a navigation/compass screen. When a screen is selected from the menu structure (e.g., via touch input to the configurable displays 114, via user manipulation of the modular programmable widgets 116, via voice commands, etc.), the selected screen or function may be provided on the configurable display 114.

As shown in greater detail below, the display application 132 may be further configured to allow a user to configure the modular programmable widgets 116 to operate as short-cuts to various functionality of the HMI display system 104. Accordingly, when driving the user may be able to quickly access the bookmarked functions or screens using the modu-lar programmable widget 116, to provide for quick selection by the HMI display system 104 on the configurable display 114.

The display application 132 may maintain display settings 134 indicative of the mapping of modular programmable widgets 116 to the functionality of the HMI display system 104. For instance, responsive to the connection of a modular programmable widget 116 to the HMI display system 104, the display application 132 may transition the configurable display 114 to a screen for the configuration of the modular programmable widget 116. The configurable display 114 may allow the user to select which functions are to be controlled by which controls of the modular programmable widget 116. The display setting 134 may then be stored to the memory 108 and used to interpret input received to the modular programmable widget 116 by the HMI display system 104.

Various types of modular programmable widget 116 may be utilized. In a first option, the modular programmable widgets 116 may utilize uses a mortise-tenon style interface with a spring loaded connecting to the configurable display 114 backside. Connectors may pass power and data between the modular programmable widget 116 and the configurable display 114. When the modular programmable widget 116 is disconnected, the user may utilize the connector ports for charging and/or data connectivity to the configurable display 114 (e.g., when the vehicle 102 is parked). Details of the first option are discussed in detail with respect to FIGS. 3A-10.

In a second option, a slide out tray may be provided from the back side of the configurable display 114. The tray may expose a gird of detents with connecting pins in each slot. A user may install the desired modular programmable widgets 116 individually, with internal magnets securing them into place. The display tray may provide structure against inter-action loads. Details of the second option are discussed in detail with respect to FIGS. 11A-13.

In a third option, a dove tail slide track setup may be used for securing of the modular programmable widgets 116 to the configurable display 114. The opening to the track may be provided on the passenger side, such that the modular programmable widget 116 may slide into place through the grove. Detents and internal magnets may be used to aid in alignment of the modular programmable widgets 116 into one of a set of positions, where each position has mating pins for data and power. The dove tail geometry may provide structure against interaction loads. Details of the third option are discussed in detail with respect to FIGS. 14A-17.

In a fourth option, a toe-in hook feature along with internal magnets may be used for securing the modular programmable widgets 116 to the configurable display 114. The hook feature may secure the modular programmable widget 116 to a track slit below the configurable display 114. The pins and detents may align for power and data transfer. Details of the fourth option are discussed in detail with respect to FIGS. 18A-20.

Figure 3A:
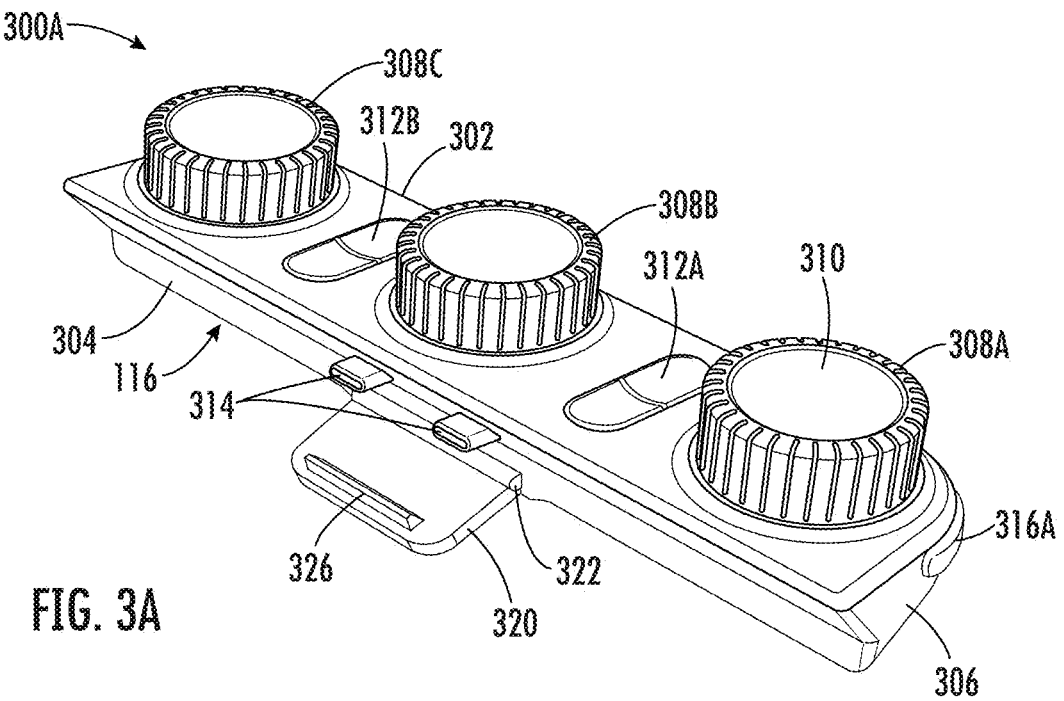
FIG. 3A illustrates an example perspective view illustrating details of the front of an example modular programmable widget, in accordance with the first option.
Figure 3B:
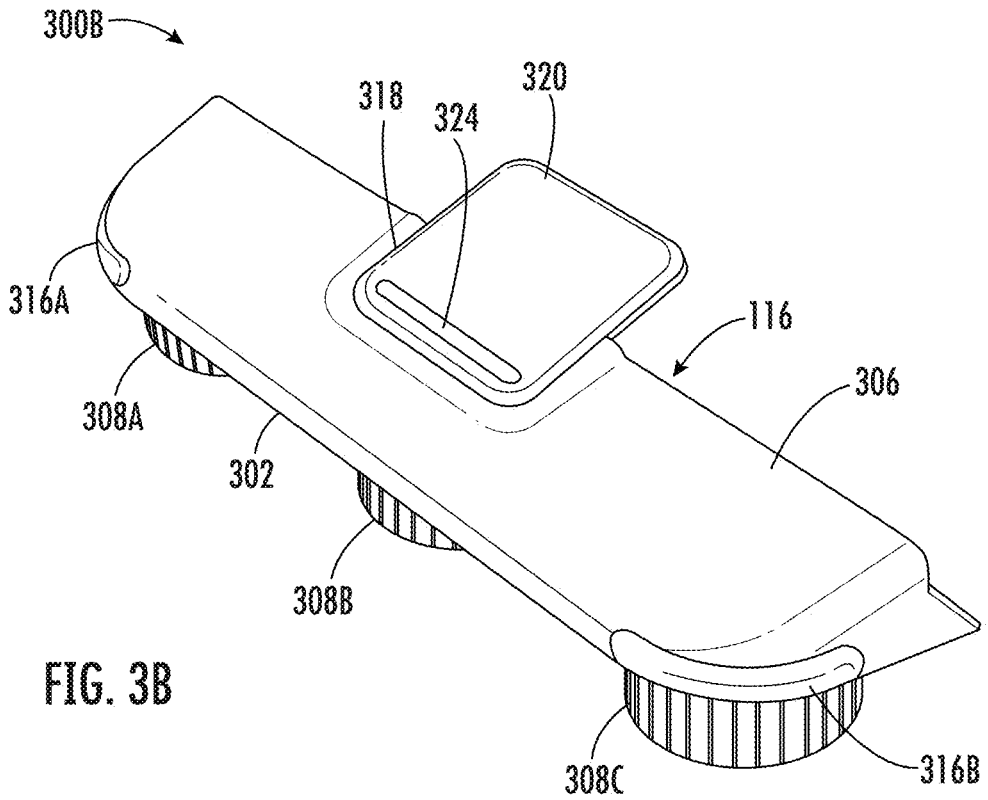
FIG. 3B illustrates an example perspective view illustrating details of the rear of the example modular programmable widget of FIG. 3A.

FIG. 3A illustrates an example perspective view illustrat-ing details of the front of an example modular program-mable widget 116, in accordance with the first option. FIG. 3B illustrates an example perspective view illustrating details of the rear of the example modular programmable widget 116 of FIG. 3A.

Referring collectively to FIGS. 3A-3B, an enclosure of the modular programmable widget 116 may be formed by a front panel 302, top panel 304, and rear panel 306. The enclosure may form a generally rectangular body. Controls may be provided on the front panel 302, while connectivity to the vehicle 102 may be provided on the top panel 304. The front panel 302 may be provided in various appearances, such as finish styles or colors. In some examples, different appearances may correspond to different available function-ality. In other examples, different appearances may be cho-sen according to user preference. The top panel 304 and rear panel 306 may comprise the remainder of the enclosure, including the rear and side walls, that houses the internal circuitry and other components of the modular programmable widget 116.

The front panel 302 of the modular programmable widgets 116 may support various controls that may be manipulated by the user. In this example, these controls include programmable dials 308A, 308B, 308C (collectively programmable dials 308). The programmable dials 308 may be rotary encoders configured to receive rotational input from a user, e.g., for selection of a continuous parameter such as volume or temperature, for selection from a menu of choices, etc. The programmable dials 308 may further include a center button 310 such that the programmable dial 308 may be pressed for binary parameter control (e.g., mute), preset recall, to move to a next item in a list (e.g., of media inputs, radio stations, etc.). In some examples, the center button 310 may further include display functionality, such the front face of the center button 310 may show an icon or other representation of the functionality assigned to the programmable dial 308.

The controls may additionally or alternately include programmable toggles 312A, 312B (collectively programmable toggles 312). As shown, the programmable toggles 312 each include two individual button controls, which may be useful for adjusting a continuous parameter upwards or downwards, again such as volume or temperature. However, in other examples each button of the programmable toggles 312 may be assigned to a specific function. Additionally, it should be noted that the programmable toggles 312 in other examples may be unitary buttons or switches.

A top panel 304 of the modular programmable widget 116 may operate as a compression pad to facilitate connection of the modular programmable widgets 116 to the configurable display 114. Additionally, the top panel 304 may include a pair of electrical connectors 314. These electrical connector 314 may be universal serial bus (USB), such as male USB-C connectors in an example, but other types, shapes, and protocols of connector are possible. As shown, the electrical connectors 314 are each of the same type, but it should be noted that in other examples, the electrical connectors 314 may be of different types, such as one connector of a first type for power and a second connector of a second type for data.

A rear panel 306 of the modular programmable widget 116 may have a smooth back face to facilitate attachment, detachment, and use of the modular programmable widget 116. One or more hidden buttons 316 may be provided in the rear panel 306. As shown, hidden buttons 316A and 316B are housed in the lower corners of the rear panel 306 of the modular programmable widget 116. Similar to the functionality of the programmable toggles 312, the hidden buttons 316 may also be assignable to various functions.

The rear panel 306 may define a latch recess 318. The latch recess 318 may provide a sunken area forming a location for the placement of a securing clip 320. The securing clip 320 may be provided to aid in locking the modular programmable widget 116 to the configurable display 114. The securing clip 320 may define a generally flat surface that is hingedly attached to the rear panel 306 between its ends (e.g., the midpoint of the inner face). This may be performed, e.g., via a longitudinally mounded hinge pin 322 as shown. This placement of the hinge pin 322 may allow the securing clip 320 to rock between latched and unlatched positions. Additionally, the latch recess 318 may allow for the outer surface of the securing clip 320, at the pivot point of the hinge pin 322, to be relatively flush with the outer surface of the rear panel 306.

A position key 324, such as a ridge or rubberized insert, may be defined by the outer face of the securing clip 320. The position key 324 may be identifiable by touch by a user, to allow the user to feel for the pressable lower portion of the securing clip 320 below the hinge pin 322 without being able to see the securing clip 320. Once located by touch, the position key 324 of the securing clip 320 may be pressed inwards by the user to cause the upper portion of the securing clip 320 to move outwards.

A retention tab 326 may be defined by the inner face of the securing clip 320. The retention tab 326 may extend outwards from the securing clip 320 to serve to lock the securing clip 320 in place when attached to the configurable display 114. A biasing member (not shown) such as a spring may be provided internally to bias the lower portion of the securing clip 320 outwards, and therefore bias the upper portion of the securing clip 320 inwards into the locked position.

Figure 4:
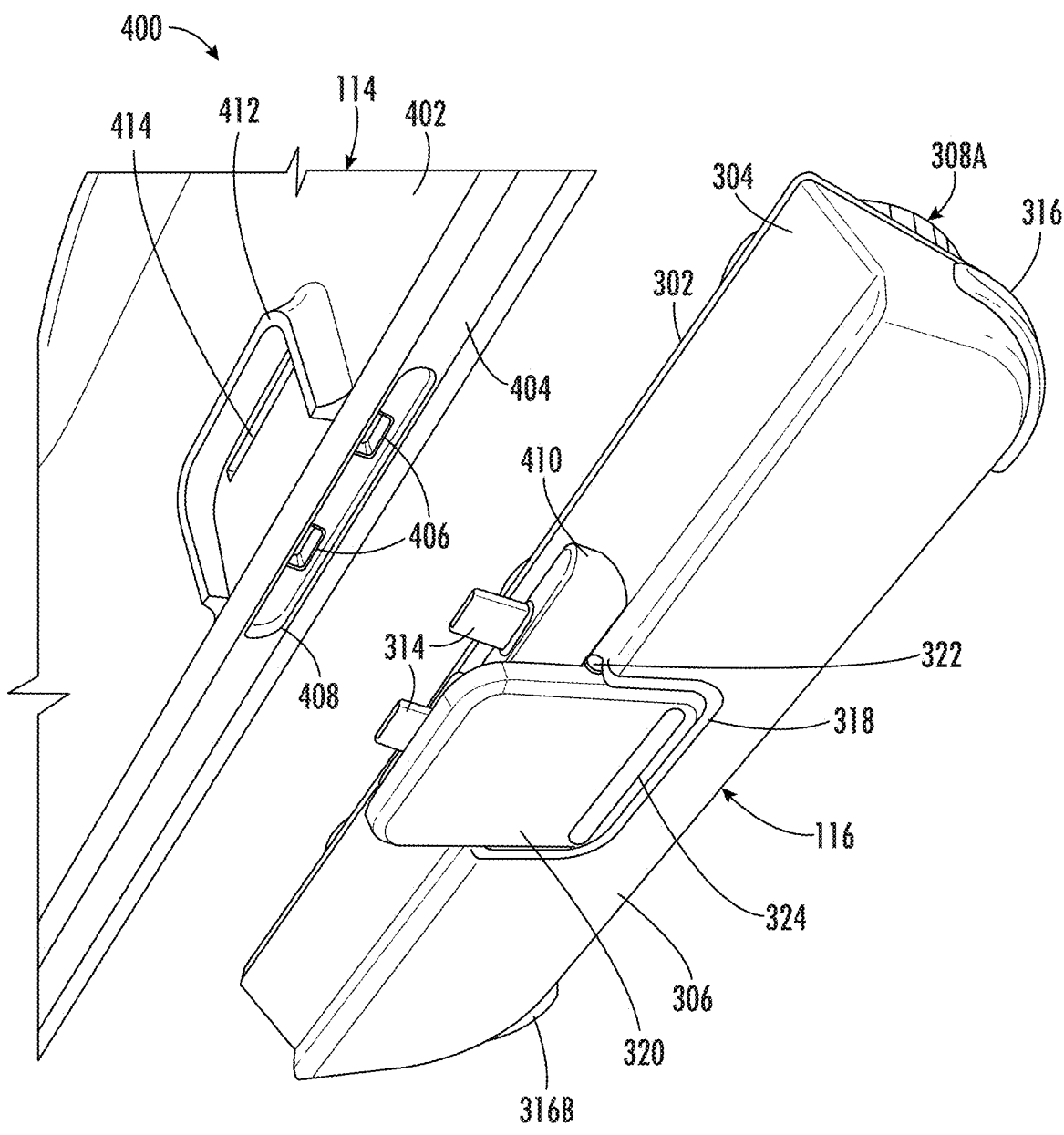
FIG. 4 illustrates an example bottom perspective view of details of the connection point between the modular programmable widget and the configurable display.

FIG. 4 illustrates example bottom perspective view 400 of details of the connection point between the modular programmable widget 116 and the configurable display 114. As shown, the configurable display 114 has a back panel 402 that defines a rear surface of the configurable display 114 as well as a lower panel 404 that defines a lower surface of the configurable display 114. The lower surface defines connector ports 406 that are spaced apart to facilitate connection with the electrical connectors 314 of the modular programmable widget 116. These connector ports 406 may also be used for charging when the modular programmable widget 116 is disconnected from the configurable display 114. In a nonlimiting example, the connector ports 406 may be USB-C ports to correspond with male USB-C electrical connectors 314 of the modular programmable widget 116.

The connector ports 406 may be placed in a mortise 408 feature defined as a recess into the lower panel 404. The mortise 408 may provide for physical protection of the connector ports 406 by taking physical load off the electrical connectors 314 themselves. As shown, the mortise 408 may mate with a tenon 410 feature of the modular programmable widget 116 aid in securing the configurable display 114 and the modular programmable widget 116 from X- and Y-axis loads.

The back panel 402 of the configurable display 114 may further define a connection recess 412 into which the securing clip 320 of the modular programmable widget 116 may attach to the configurable display 114. The connection recess 412 may further define a relief area 414 corresponding to the dimensions of the retention tab 326 to allow the securing clip 320 to mate with the back panel 402 of the configurable display 114, thereby securing the modular programmable widget 116.

Figure 5:
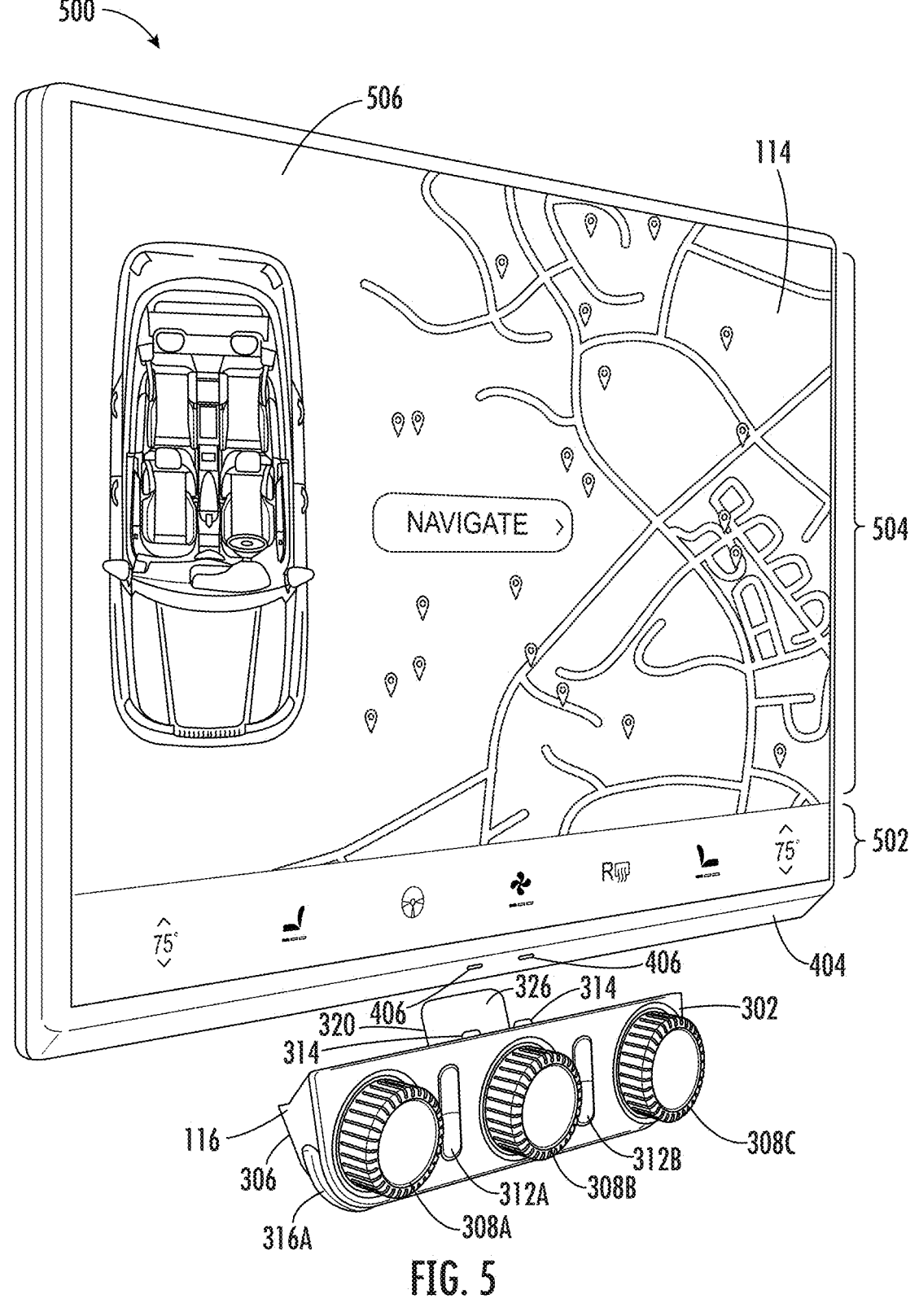
FIG. 5 illustrates an example front perspective view of the modular programmable widget oriented for connection to the configurable display.

FIG. 5 illustrates an example front perspective view 500 of the modular programmable widget 116 oriented for connection to the configurable display 114. As shown, the electrical connectors 314 of the modular programmable widget 116 are aligned with the connector ports 406 along the lower panel 404 of the configurable displays 114. The modular programmable widget 116 may then be pressed upward to connect into place on the configurable display 114.

Also as shown, the configurable display 114 include a climate screen area 502 offering touch controls to manipulate various climate control functions of the vehicle 102. The configurable display 114 may include a main screen area 504 in which the currently active application may be displayed.

The configurable display 114 may also include a general information area 506 from which vehicle status information may remain visible to the user, regardless of the specific screen or application that is active in the main screen area 504.

Figure 6:
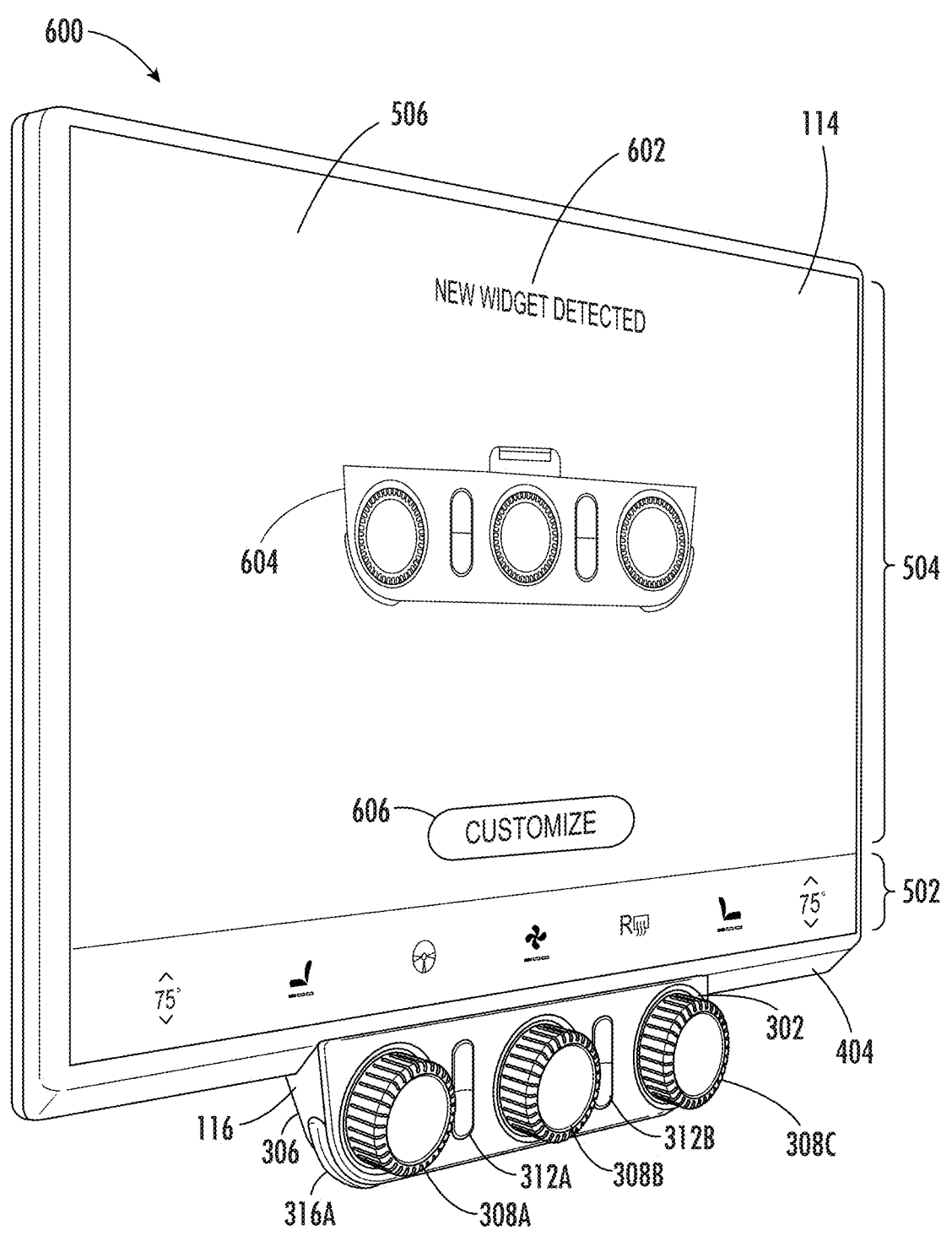
FIG. 6 illustrates an example front perspective view of the modular programmable widget of FIG. 5 connected to the configurable display.

FIG. 6 illustrates an example front perspective view 600 of the modular programmable widget 116 of FIG. 5 connected to the configurable display 114. Responsive to connection of the modular programmable widget 116 to the configurable display 114, the main screen area 504 of the configurable display 114 may change to a screen for the configuration of the modular programmable widget 116. As shown, the main screen area 504 includes a status message 602 indicating that a new modular programmable widget 116 has been connected to the configurable display 114. It should be noted that, in some examples, configuration of the modular programmable widget 116 may be restricted to when the vehicle 102 is in park.

The main screen area 504 may include a visual representation 604 of the modular programmable widget 116 that was plugged in. In some examples, a generic visual representation 604 may be shown. In other examples, the modular programmable widget 116 may provide information to the configurable display 114 via the electrical connectors 314 indicative of the type of the modular programmable widget 116. This information may indicate, for example, that the modular programmable widget 116 is an HMI device. The information may further include information such as model of the modular programmable widget 116, color of the modular programmable widget 116, quantity of programmable dials 308, quantity of programmable toggle 312, quantity of hidden buttons 316 or other controls, etc., which may be used to allow the configurable display 114 to display an image consistent with the modular programmable widget 116 that is attached.

The main screen area 504 may also include a customize button 606 that, when selected by a user, allows the user to configure the functions that are performed when the programmable dials 308, programmable toggles 312, hidden buttons 316, or other controls of the modular programmable widgets 116 are used.

Figure 7:
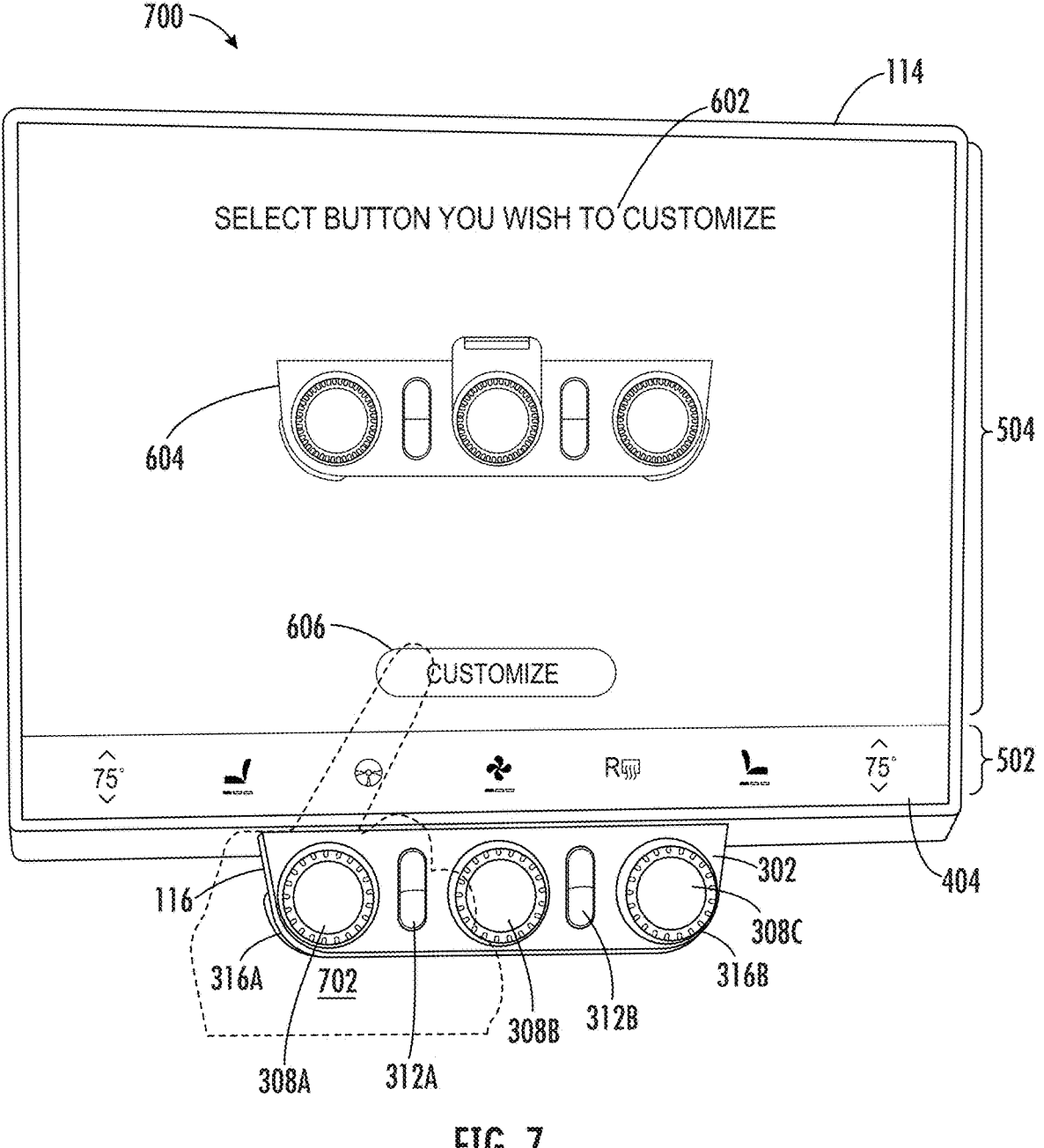
FIG. 7 illustrates an example front view of selection of the customize control from the configurable display of FIG. 6 to configure the modular programmable widget.

FIG. 7 illustrates an example front view 700 of selection of the customize button 606 from the configurable display 114 of FIG. 6 to configure the modular programmable widget 116. Responsive to the selection, the main screen area 504 of the configurable display 114 may change to a screen for selection of one of the controls of the modular programmable widget 116 to be assigned a function. As shown, the status message 602 is updated to request for the user to select one of the controls from the visual representation 604 of the modular programmable widget 116 to be configured.

Figure 8:
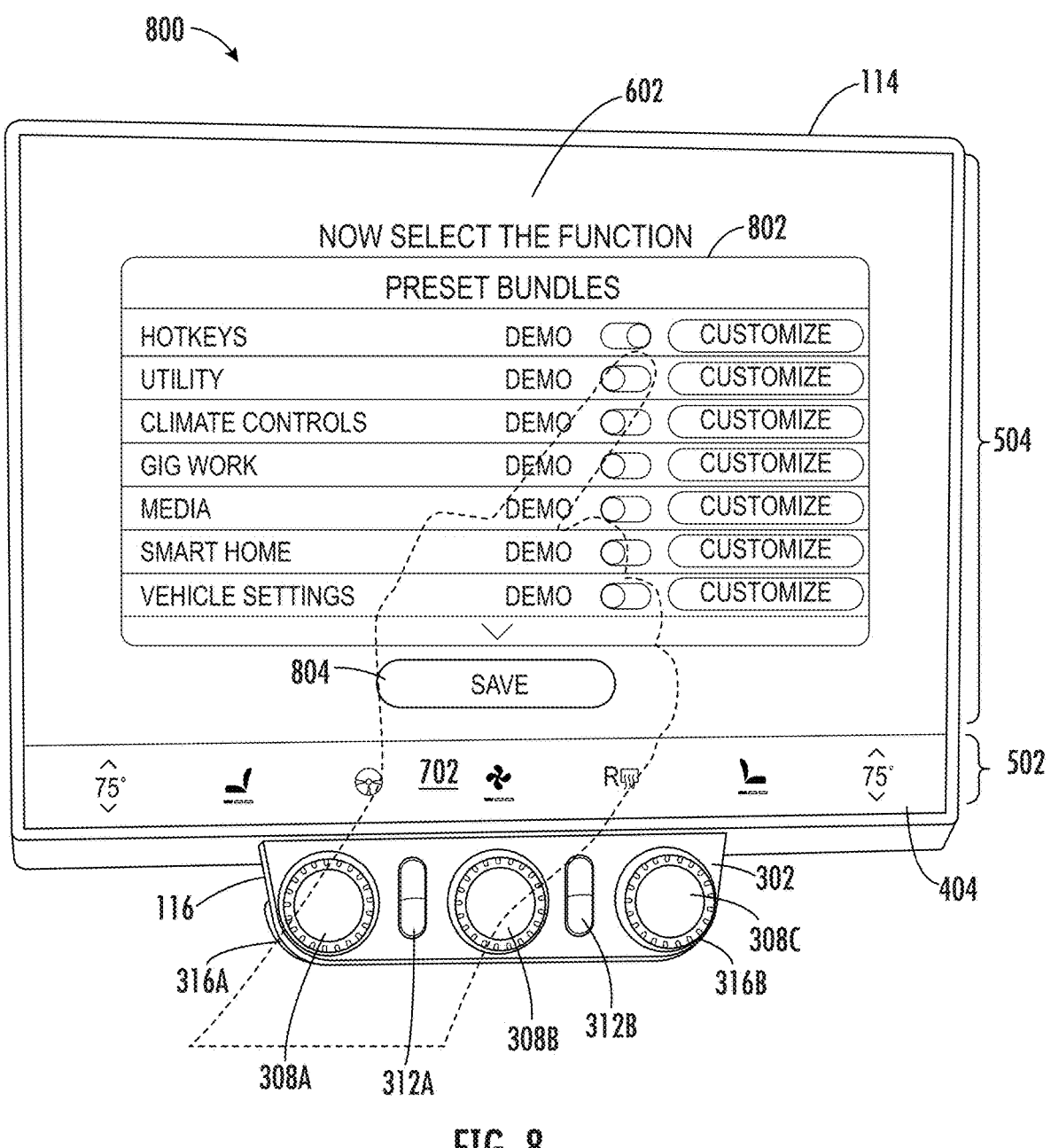
FIG. 8 illustrates an example front view of selection of the function for the control of the modular programmable widget that is selected for configuration in FIG. 7.

FIG. 8 illustrates an example front view 800 of selection of the function for the control of the modular programmable widget 116 that is being configured. Responsive to the selection of the control, the main screen area 504 of the configurable display 114 may change to a screen for selection of one of the functions that can be assigned to the control. As shown, the status message 602 is updated to request for the user to select one of the functions from a function listing 802. The functions may include, as some examples, hot keys (e.g., quick selection of menu operations within the menu structure of the vehicle), utility controls (e.g., towing functions), climate control functions (e.g., temperature settings, fan settings, etc.), gig work function (e.g., rideshare commands), media control functions (e.g., volume, station presets, media input selection), smart home settings (e.g., garage door operation, home climate control settings), vehicle settings (e.g., interior lighting settings, gauge cluster display modes), etc., that may be invoked or updated responsive to selection of the control being configured. Once the assignment of a function has been performed, the user may select a save control 804 to apply the changes to the HMI display system 104.

Figure 9:
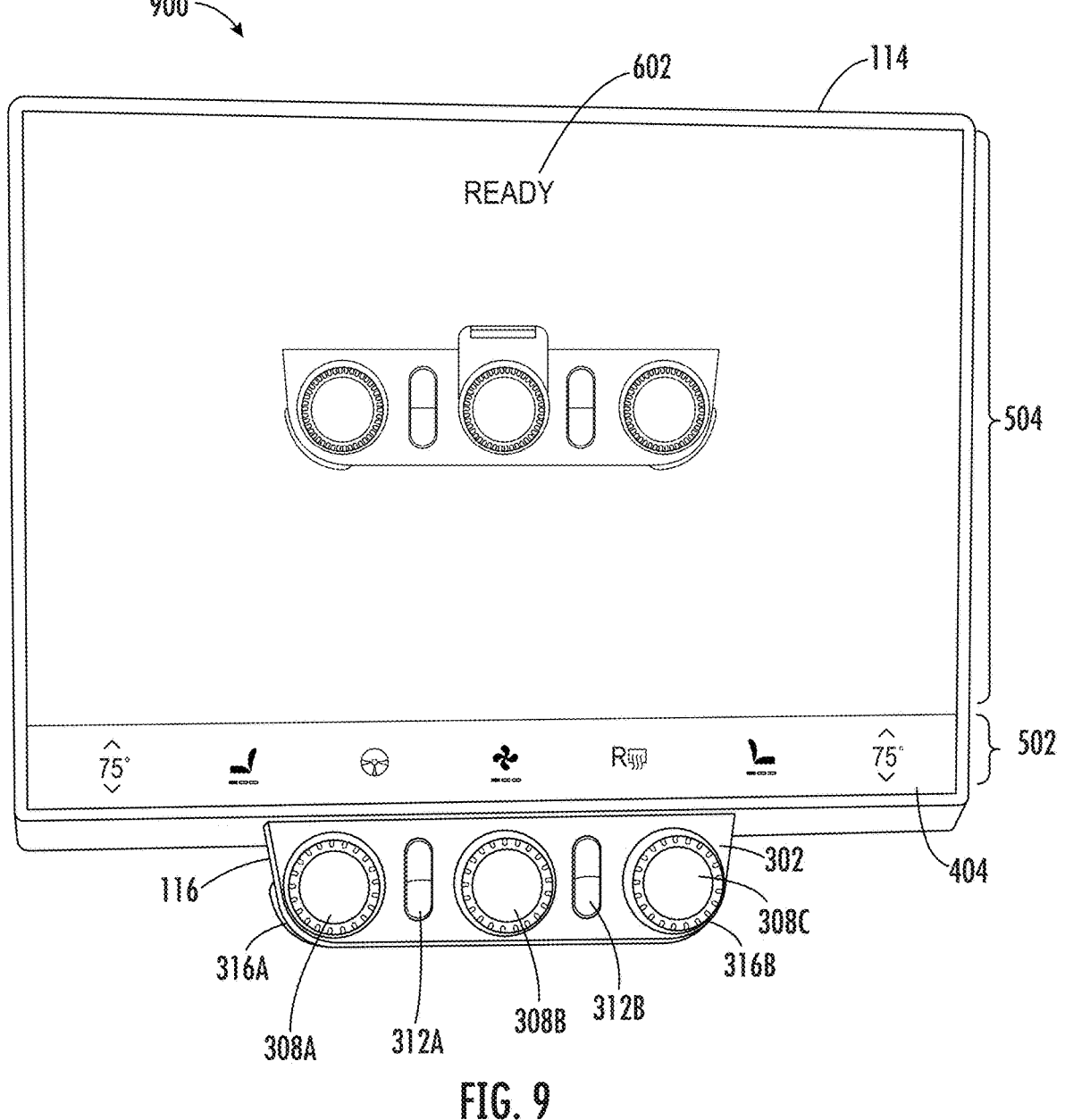
FIG. 9 illustrates an example front view of completion of the configuration of the control of the modular programmable widget of FIG. 8.

FIG. 9 illustrates an example front view 900 of completion of the configuration of the control of the modular programmable widget 116. As indicated by the status message 602, the control is ready for use. It should be noted that the operations illustrated in FIGS. 6-9 may be repeated to allow for the configuration of each of the controls of the modular programmable widget 116. Similarly, these operations may be used for reconfiguration of the controls of the modular programmable widget 116.

The mapping of the functions to the controls of the modular programmable widget 116 may be maintained to the display setting 134 stored to the memory 108, to allow the configurable display 114 to perform the configured function. For instance, responsive to a user selecting one of the controls of the modular programmable widget 116, the modular programmable widget 116 may send a message to the configurable display 114 via the electrical connector 314 indicating which button was pressed. The configurable display 114 may access the memory 108 to identify, from the display setting 134, the corresponding function to be performed. The configurable display 114 may then perform the requested function.

Figure 10:
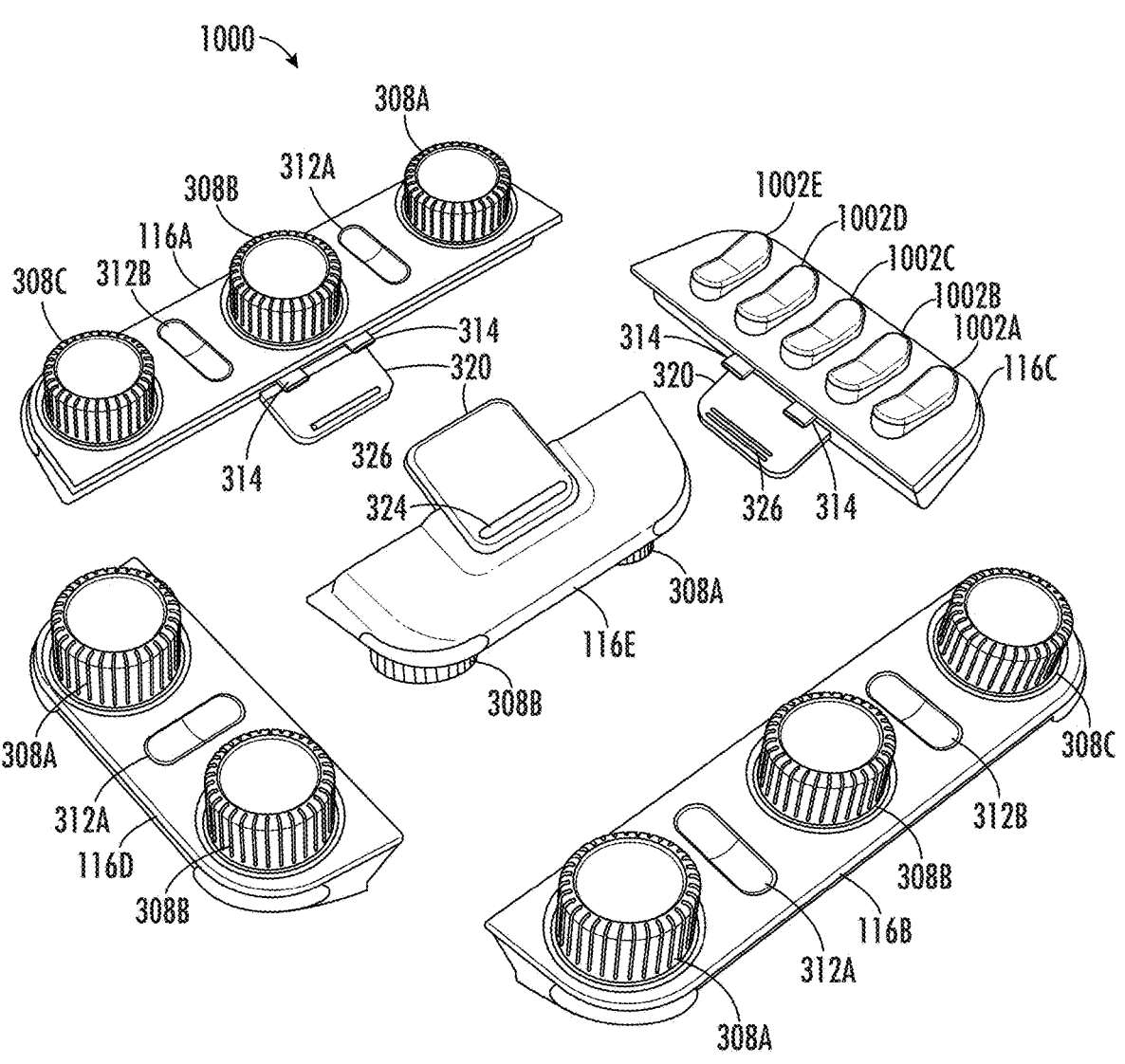
FIG. 10 illustrates an example perspective view of modular programmable widgets having various types and quantities of controls.
Figures 11A, 11B, 11C, 11D:
FIG. 11A illustrates an example perspective view of a configurable display having a slide out tray in a completely closed state.
FIG. 11B illustrates an example perspective view of the configurable display of FIG. 11A partially slid open to a first extent.
FIG. 11C illustrates an example perspective view of the configurable display of FIG. 11A partially slid open to a second, greater extent.
FIG. 11D illustrates an example perspective view of the configurable display of FIG. 11A completely slid open and available for use.

FIG. 10 illustrates an example perspective view 1000 of modular programmable widgets 116 having various types and quantities of controls. As shown, the first modular programmable widget 116A has three programmable dials 308 and two programmable toggles 312. The second modular programmable widget 116B also has three programmable dials 308 and two programmable toggles 312, but with a different appearance scheme.

The third modular programmable widget 116C, however, has an array of programmable switches 1002, as opposed to programmable dials 308 or programmable toggles 312. Similar to the programmable toggle 312, the programmable switches 1002 may also be assigned to functions as discussed above. The fourth modular programmable widget 116D has two programmable dials 308 and a single programmable toggle 312. The fifth modular programmable widget 116E also has two programmable dials 308 and a single programmable toggle 312, but with a different appearance scheme.

Significantly, despite the differences in controls and size of the modular programmable widgets 116A-E, the modular programmable widgets 116 each define the same connection components. For instance, each of the modular programmable widgets 116A-E has the same electrical connectors 314 and securing clip 320 as discussed above. Thus, any of the modular programmable widgets 116A-E may be connected to the configurable display 114, allowing for a user to choose whichever modular programmable widget 116 has the desired controls and/or appearance.

FIGS. 11A-D collectively illustrates an example configurable display 114 having a slide out tray 1102 provided from the back side of the configurable display 114. As shown in the first state 1100A in FIG. 11A, the tray 1102 is completely closed. As shown in the second state 1100B in FIG. 11B, the tray 1102 is partially slid open to a first extent. As shown in the third state 1100C in FIG. 11C, the tray 1102 is partially slid open to a second, greater extent. As shown in the fourth state 1100D in FIG. 11D, the tray 1102 is completely slid open and available for use. When in the opened state, the tray 1102 may expose a plurality of widget connectors 1104. Thus, the tray 1102 may provide a back stop for interaction loads as well as presenting surface for modular programmable widget 116 connection. The tray may be manually openable in some examples, such as by pulling the tray 1102 downwards out of the configurable displays 114. In other examples, a motor may be provided within the configurable display 114 to open or close the tray 1102.

Figure 12:
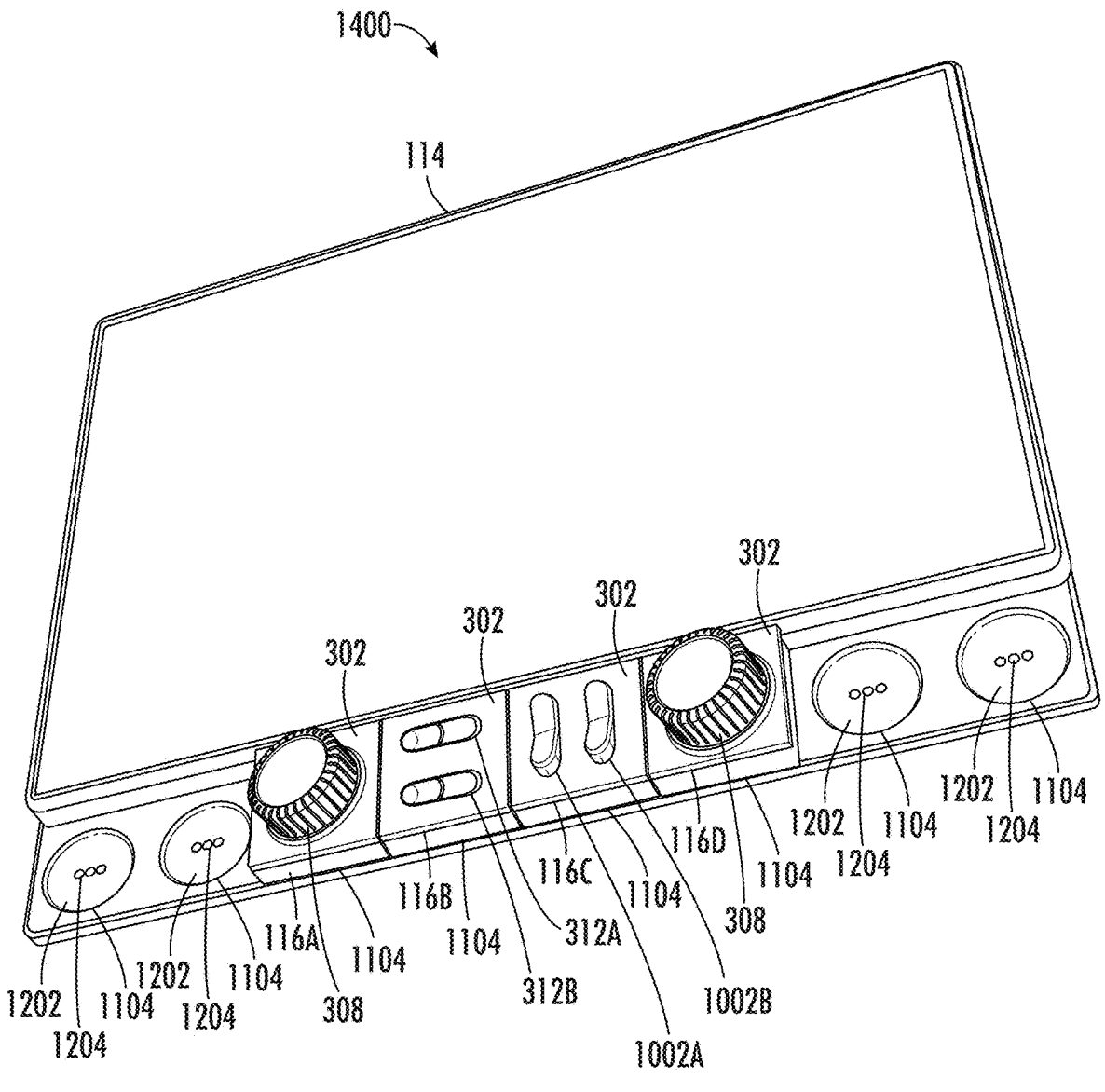
FIG. 12 illustrates an example front perspective view of the configurable display of FIGS. 11A-D with modular programmable widgets connected to a subset of the widget connectors.

FIG. 12 illustrates an example front perspective view 1200 of the configurable display 114 with modular programmable widgets 116 connected to a subset of the widget connector 1104. As shown, each of the widget connector 1104 may defines a recessed area 1202 (here in a circular or dish shape) with an electrical connector 1204 provided within the recessed area 1202. While not shown in FIG. 12, magnets may be provided within the tray 1102 to secure the modular programmable widgets 116 into the widget connectors 1104.

As compared to the modular programmable widgets 116 discussed with respect to the first option, the modular programmable widgets 116 in the second option may take a simpler, more right rectangular prism form. Each of the modular programmable widgets 116 may include one or more controls. For instance, the first modular programmable widget 116A has a programmable dial 308; the second modular programmable widget 116B has two programmable toggles 312A-B; the third modular programmable widget 116C has two programmable switches 1002A-B; and the fourth modular programmable widget 116C again has a single programmable dial 308.

Similar to as discussed above, the front panel 302 of the modular programmable widget 116 may be provided in various appearances, such as finish styles or colors. In some examples, different appearances may correspond to different available functionality. In other examples, different appearances may be chosen according to user preference.

Figure 13:
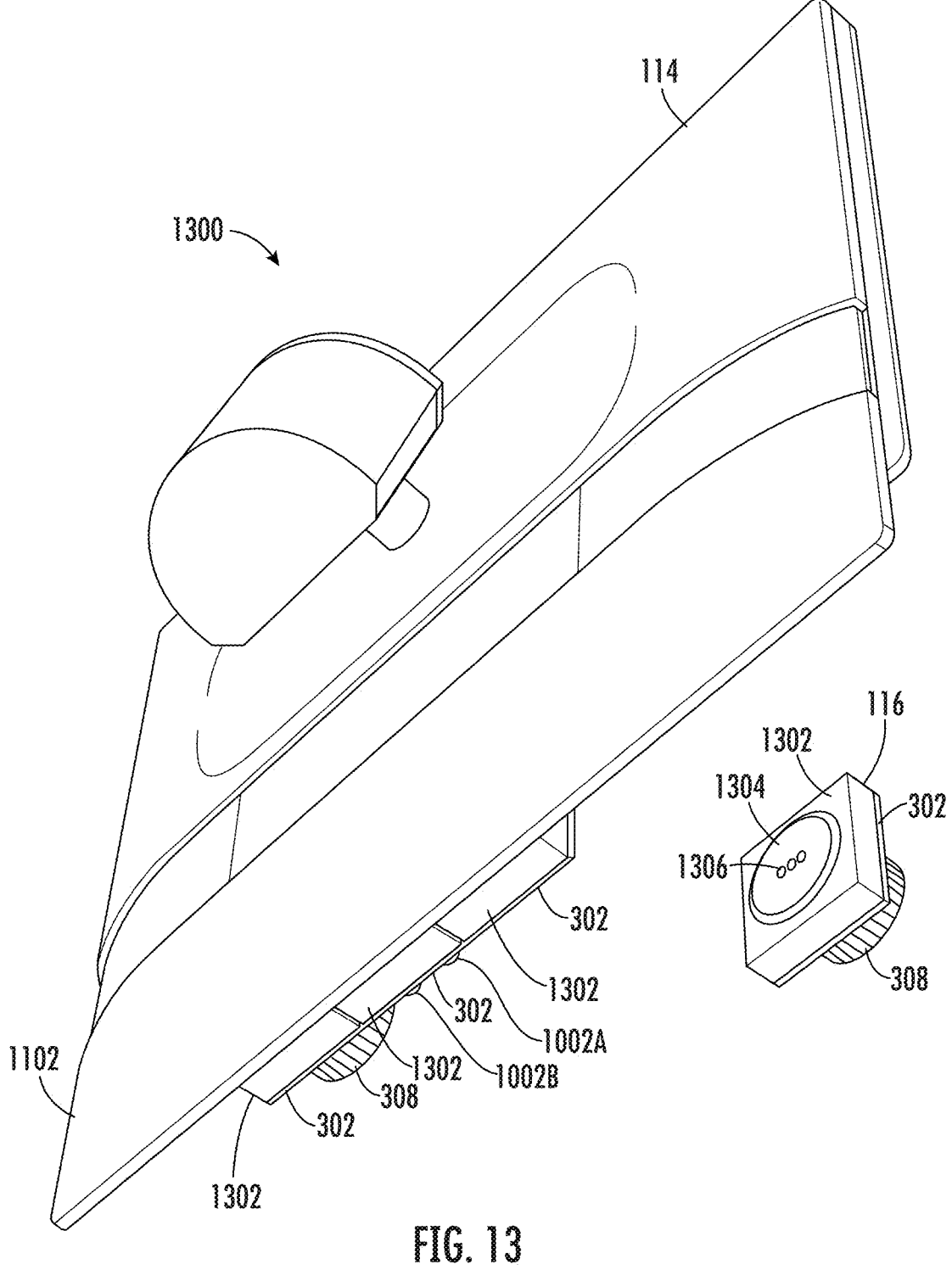
FIG. 13 illustrates an example rear perspective view of the configurable display of FIGS. 11A-D with modular programmable widgets connected to a subset of the widget connectors.

FIG. 13 illustrates an example rear perspective view 1300 of the configurable display 114 of FIGS. 11A-D with modular programmable widgets 116 connected to a subset of the widget connectors 1104. As best seen in the rear perspective views 1300, the modular programmable widgets 116 includes the front panel 302 and an enclosure 1302 that houses the internal circuitry and other components. Here, the enclosure 1302 defines side and rear walls of a right rectangular prism shape, while the front panel 302 defines the remaining front face of the rectangular prism.

The rear wall of the enclosure 1302 may define a protruding area 1304 conforming with the dimensions of the recessed area 1202 to allow the modular programmable widget 116 to be inserted into the recessed area 1202 of the tray 1102. The protruding area 1304 may, in turn, define electrical contacts 1306 located to provide electrical connection with the electrical connector 1204 located in the recessed area 1202. When the modular programmable widgets 116 is attached into the recessed area 1202, the electrical contacts 1306 may meet the electrical connector 1204. This may according provide for power transmission from the configurable display 114 to the modular programmable widgets 116 as well as data transmission between the configurable displays 114 and the modular programmable widgets 116.

It should be noted that the operations illustrated in FIGS. 6-10 may be performed to allow for the configuration of the modular programmable widgets 116. For instance, the configuration may be initiated responsive to attachment of the modular programmable widget 116 to the tray 1102, and the resultant forming of the electrical connection between the electrical connector 1204 and the electrical contacts 1306.

Figure 14A:
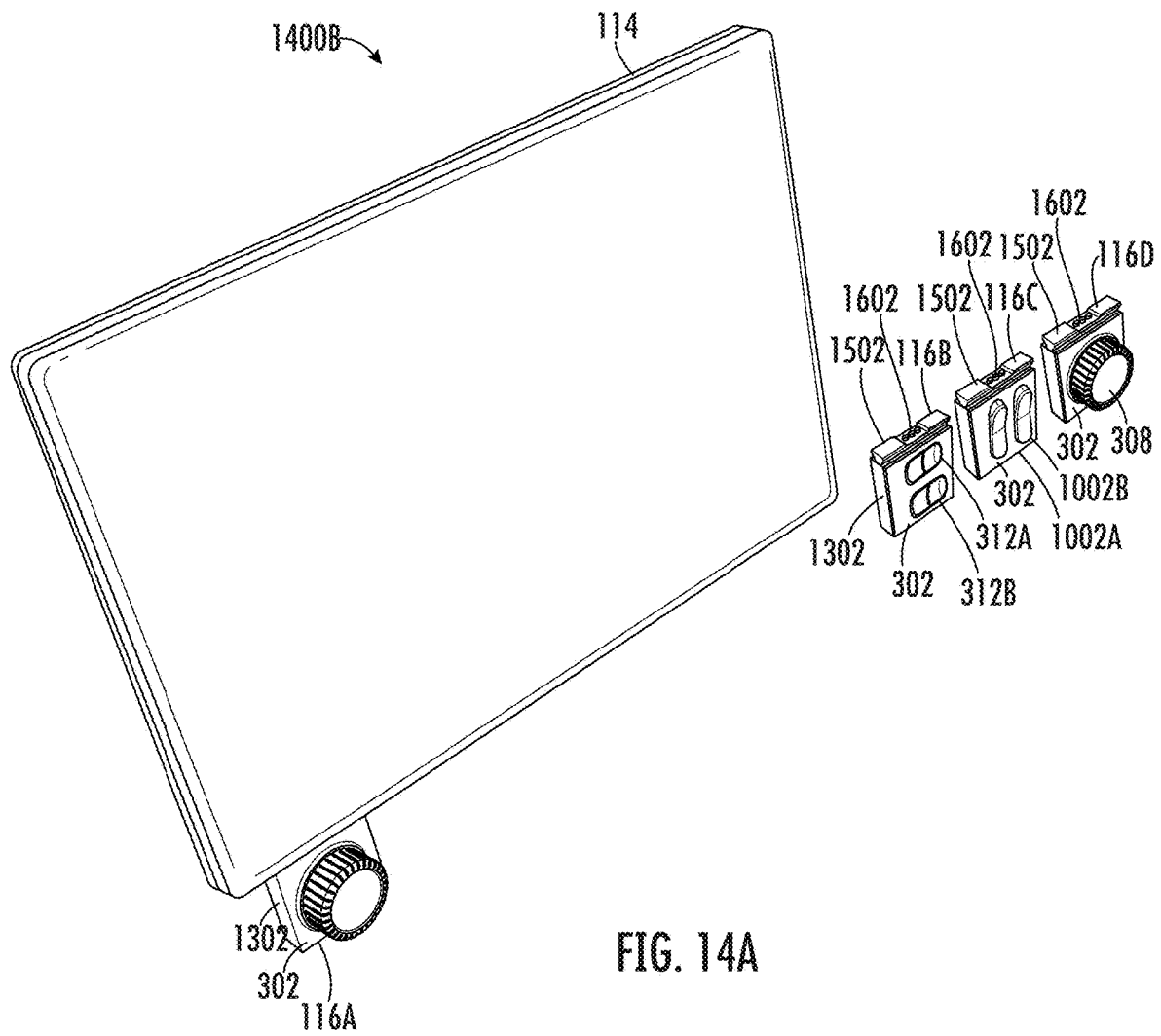
FIG. 14A illustrates an example perspective view of a configurable display having a dovetail slide track for securing of the modular programmable widgets to the configurable display.
Figure 14B:
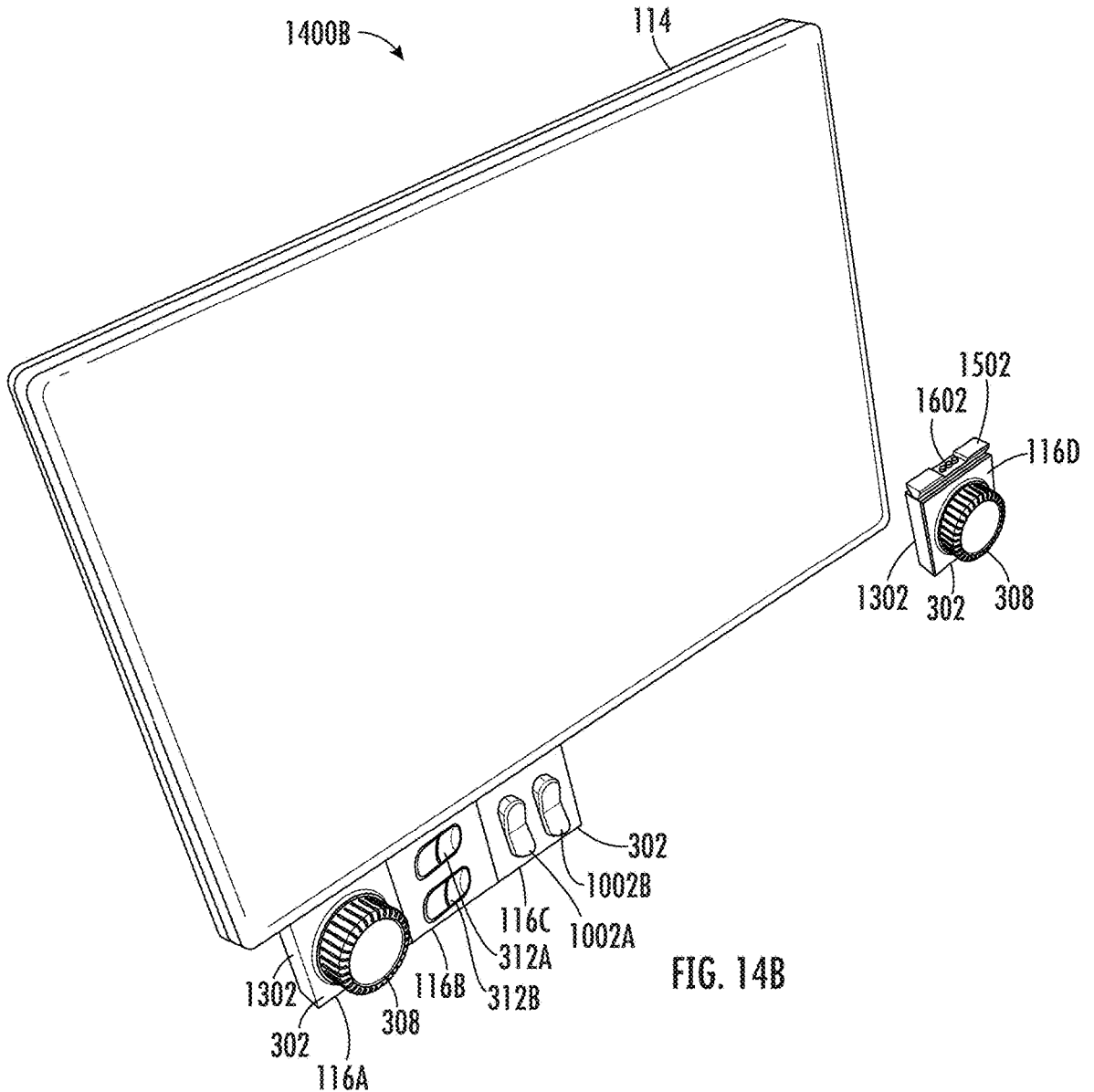
FIG. 14B illustrates an example perspective view of the configurable display having the dovetail slide track with additional of the modular programmable widgets secured to the configurable display.

FIGS. 14A-B collectively illustrates example perspective views 1400A, 1400B of a configurable display 114 having a dovetail slide track for securing of the modular programmable widgets 116 to the configurable display 114. FIG. 14A illustrates an example perspective view 1400A in which a first modular programmable widget 116A of four example modular programmable widgets 116A-D is secured to the configurable display 114. FIG. 14B illustrates an example perspective view 1400B in which the first through third of the modular programmable widgets 116A-C are secured to the configurable display 114.

Similar to the second option shown in FIGS. 11A-13, each of the modular programmable widgets 116 may include one or more controls. For instance, the first modular programmable widget 116A has a programmable dial 308; the second modular programmable widget 116B has two programmable toggles 312A-B; the third modular programmable widget 116C has two programmable switches 1002A-B; and the fourth modular programmable widget 116C again has a single programmable dial 308. However, as compared to the second option, in the third option the attachment of the modular programmable widgets 116 utilizes a dovetail mechanism.

Figure 15:
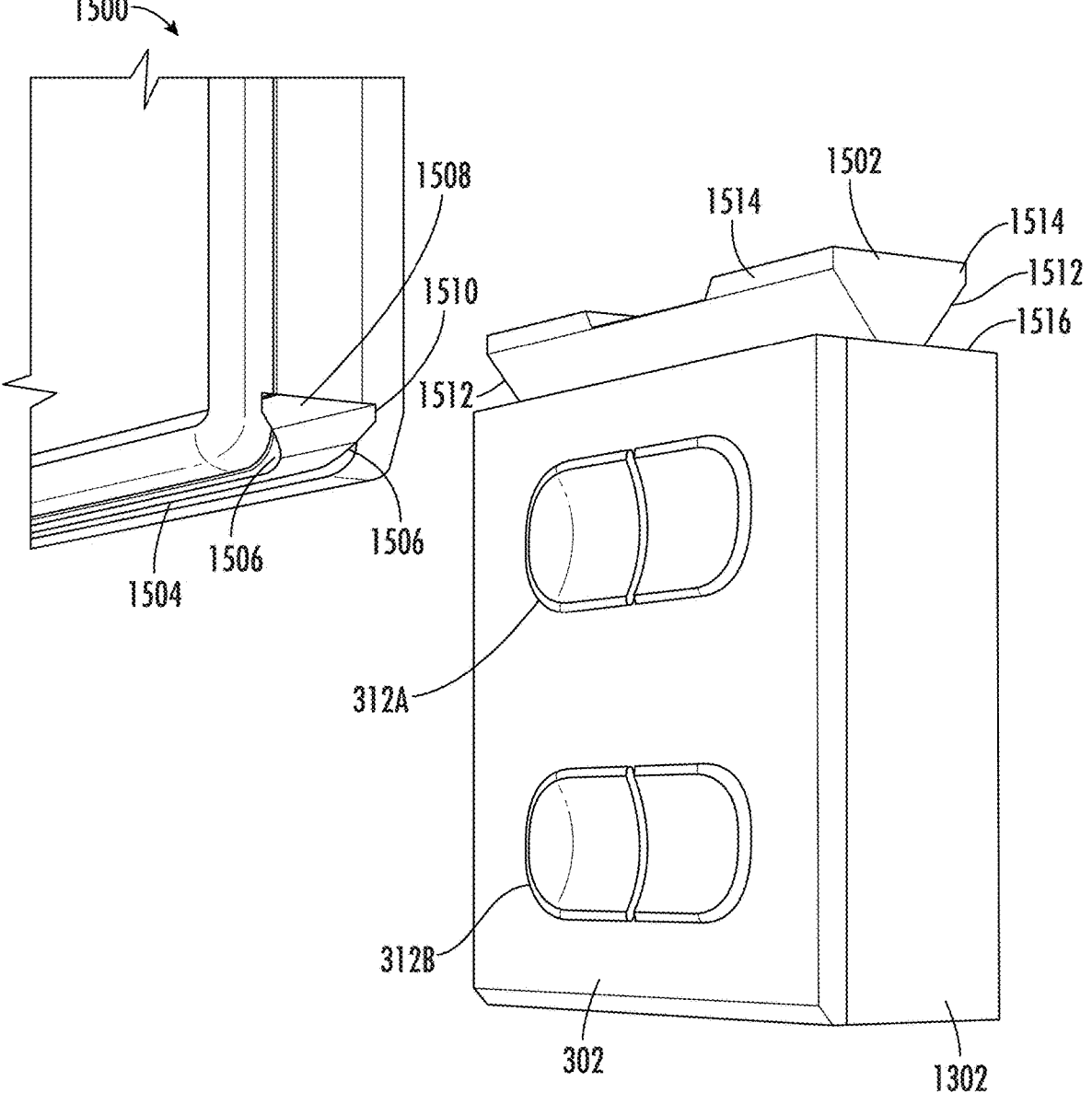
FIG. 15 illustrates a detail perspective view of the dovetail geometry of the modular programmable widget and configurable display.

FIG. 15 illustrates a detail perspective view 1500 of the dovetail geometry of the modular programmable widget 116 and configurable display 114. As shown, the top portion of the enclosure 1302 of the modular programmable widgets 116 defines a slider portion 1502 configured to be received into an elongated slide 1504 defined along the lower surface of the configurable display 114. The slider portion 1502 of the modular programmable widget 116 may be received into the elongated slide 1504 for longitudinal movement, the slide 1504 and slider portion 1502 being coupled by a suitable dovetail guide arrangement.

The dovetail guide of the slide 1504 may be provided by a recess into a lower portion of the configurable display 114. A base 1508 of the recess may be approximately parallel to the lower surface of the configurable displays 114. The recess may further define, upwards from the bottom of the configurable display 114, oppositely slanting upwardly and inwardly inclined guide surfaces 1506. These guide surfaces 1506 may terminate, at their upper ends, in parallel walls 1510 extending upwards until perpendicularly meeting into the base 1508.

The slider portion 1502 may define slide guide surfaces 1512 slanting oppositely inwardly and upwardly at an inclination corresponding to that of the guide surfaces 1506 on the slide 1504. As the configurable display 114 may receive multiple modular programmable widgets 116, the length of the slider portion 1502 may be considerably less than the length of the slide 1504. The slide guide surfaces 1512 may terminate in parallel upper walls 1514 corresponding to the length of the parallel walls 1510 above the guide surfaces 1506 of the slide 1504.

Below the guide surfaces 1506, the enclosure 1302 may define the right rectangular prism shape similar to that discussed in the second option in FIGS. 11A-13. Here, the top of the rectangular prism portion of the enclosure 1302 may serve to define a bottom guide surface 1516, such that the bottom guide surface 1516 may slide along the lower surface of the configurable display 114 as the modular programmable widget 116 is moved into, along, and/or out of the elongated slide 1504.

Figure 16:
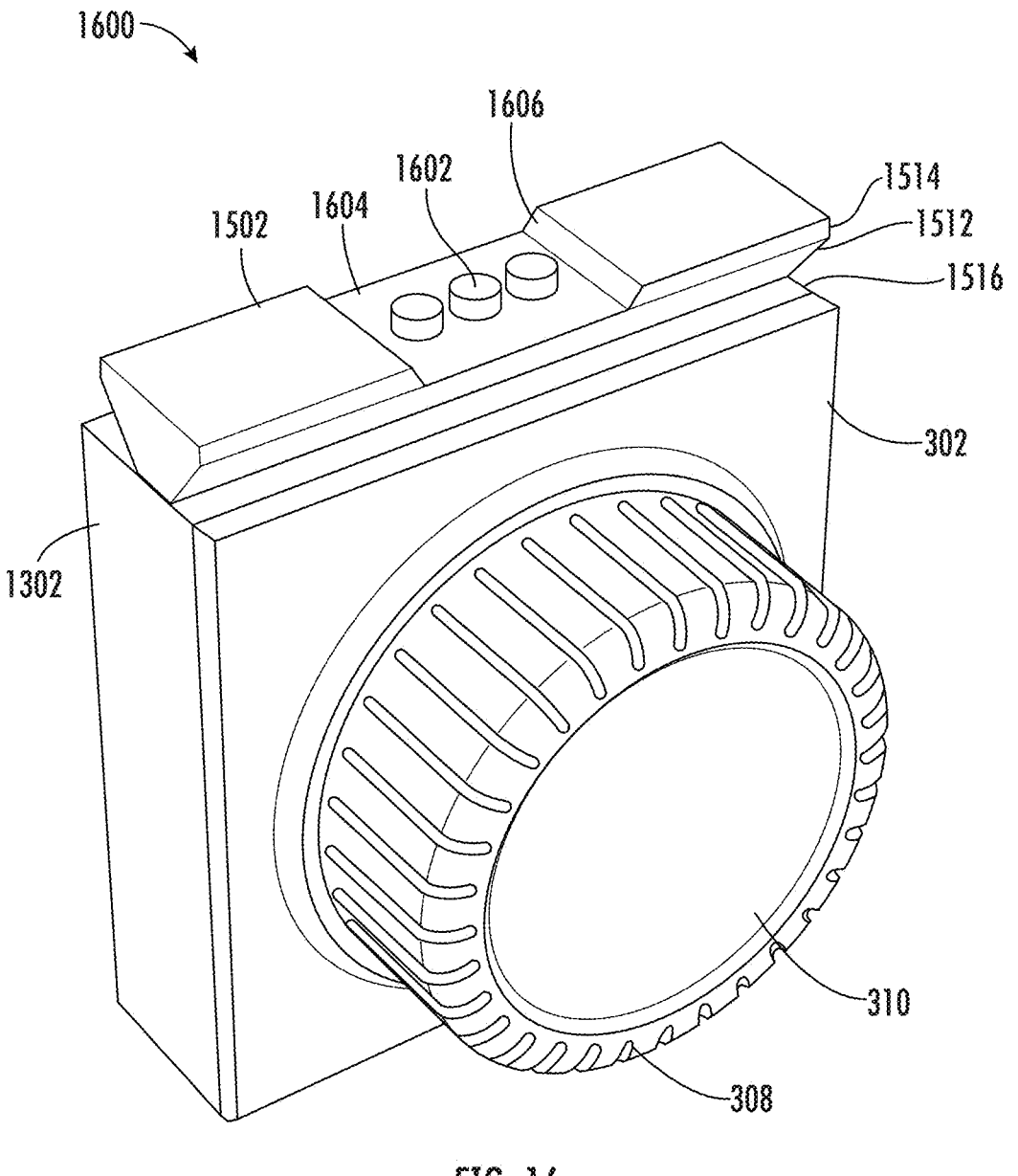
FIG. 16 illustrates an example detail perspective view of the dovetail modular programmable widget.

FIG. 16 illustrates an example detail perspective view 1600 of the dovetail modular programmable widget 116. As shown, the slider portion 1502 of the modular programmable widget 116 defines connecting pins 1602 configured to allow the modular programmable widget 116 to receive power from the configurable display 114 as well as to communicate data between the modular programmable widget 116 and the configurable display 114. To protect the connecting pins 1602, the slider portion 1502 may define a recess 1604 between ends of the slider portion 1502. The recess 1604 may define a surface below the upper extent of the slider portion 1502 from which the connecting pins 1602 may protrude upwards. In one example, the recess 1604 may be at the height of the slide guide surfaces 1512, while the total height of the slider portion 1502 may be greater due to the upward extension of the parallel upper walls 1514. The recess 1604 may be connected to the top portion of the slider portion 1502 via recess walls 1606.

Figure 17:
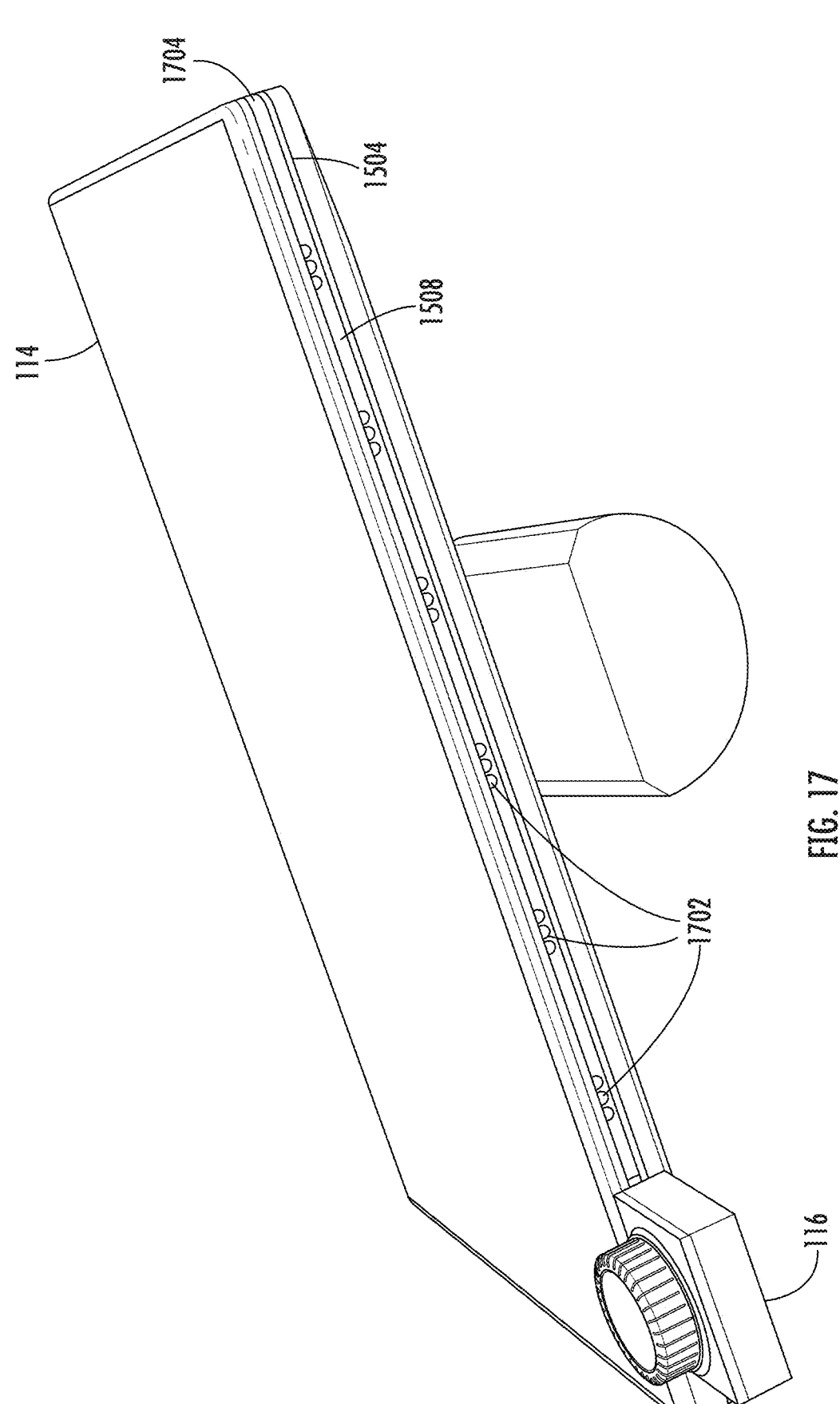
FIG. 17 illustrates an example bottom perspective view of the configurable display.

FIG. 17 illustrates an example bottom perspective view 1700 of the configurable display 114 to illustrate pin connectors 1702 defined within the base 1508 of the slide 1504. While the slide 1504 could be open on either or both sides of the configurable display 114, in the illustrated example the opening to the slide 1504 is provided on the passenger side, such that the modular programmable widget 116 may be slid into place from the passenger side towards the driver's side. While not shown, detents and/or internal magnets may be used to aid in alignment of the modular programmable widgets 116 into one of a set of positions, where each position has respective pin connectors 1702 for mating with the connecting pins 1602 of the modular programmable widget 116. Moreover, the dove tail geometry discussed herein may provide structure against interaction loads.

An opening 1704 to the track may be defined on the passenger side of the slide 1504, such that the modular programmable widget 116 may slide into place through the grove. Detents and internal magnets (not shown) may be used to aid in alignment of the modular programmable widgets 116 into one of a set of positions, where each position along the slide 1504 has mating pins for data and power. The dove tail geometry may accordingly provide structure against interaction loads.

It should again be noted that the operations illustrated in FIGS. 6-10 may be performed to allow for the configuration of the dovetail modular programmable widgets 116. For instance, the configuration may be initiated responsive to sliding into place of the modular programmable widget 116, and the resultant forming of the electrical connection between the connecting pins 1602 and the pin connectors 1702.

Figure 18A:
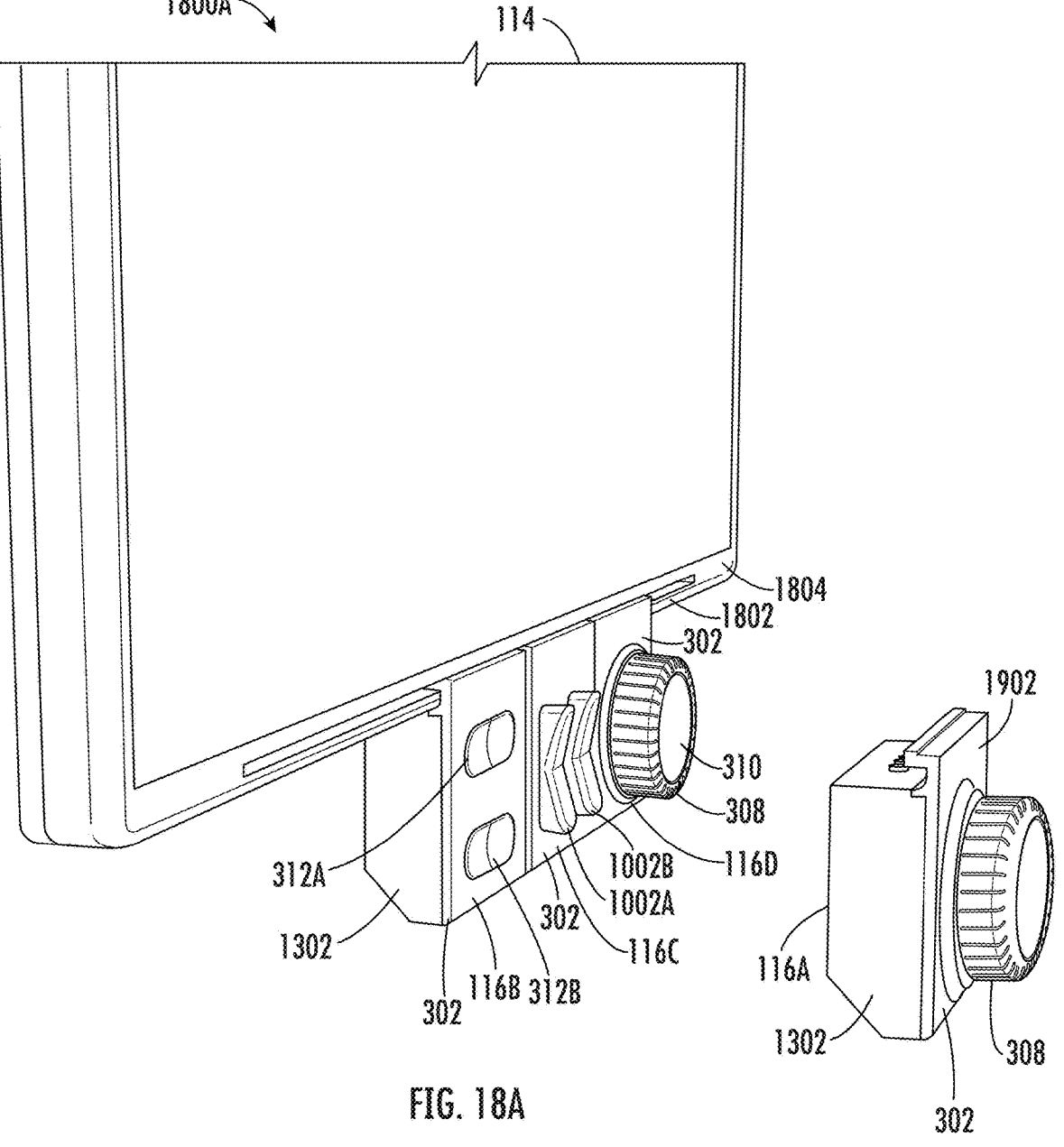
FIG. 18A illustrates an example perspective view of a configurable display having a toe-in hook feature for securing of the modular programmable widgets to the configurable display.
Figure 18B:
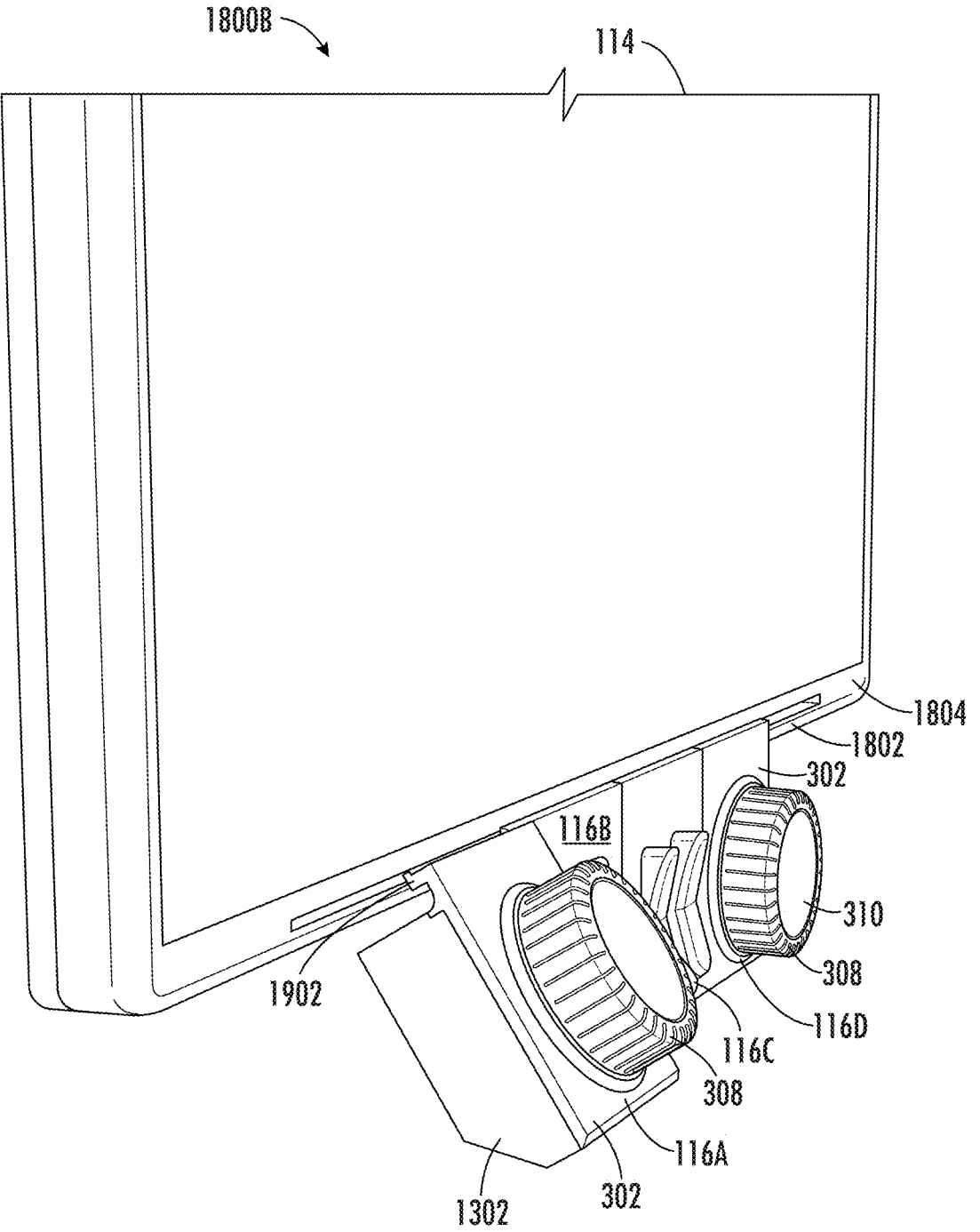
FIG. 18B illustrates an example perspective view of the configurable display of FIG. 18A in which a modular programmable widget is being presented in anticipation of being secured to the configurable display.

FIGS. 18A-B collectively illustrates example perspective views 1800A, 1800B of a configurable display 114 having a toe-in hook feature for securing of the modular programmable widgets 116 to the configurable display 114. FIG. 18A illustrates an example perspective view 1800A in which three modular programmable widgets 116B-D of four example modular programmable widgets 116A-D are secured to the configurable display 114. FIG. 18B illustrates an example perspective view 1800B in which the modular programmable widget 116A is being presented in anticipation of being secured to the configurable display 114.

As shown in FIGS. 18A-18B, the front face of the configurable display 114 may define a track 1802 below the screen. The track 1802 may define a longitudinal slot into the front panel 1804 of the configurable display 114. The front panel 1804 may be a generally planar panel with a defined depth, such that interior of the configurable display 114 behind the track 1802 is of a greater height than the slot itself.

Figure 19:
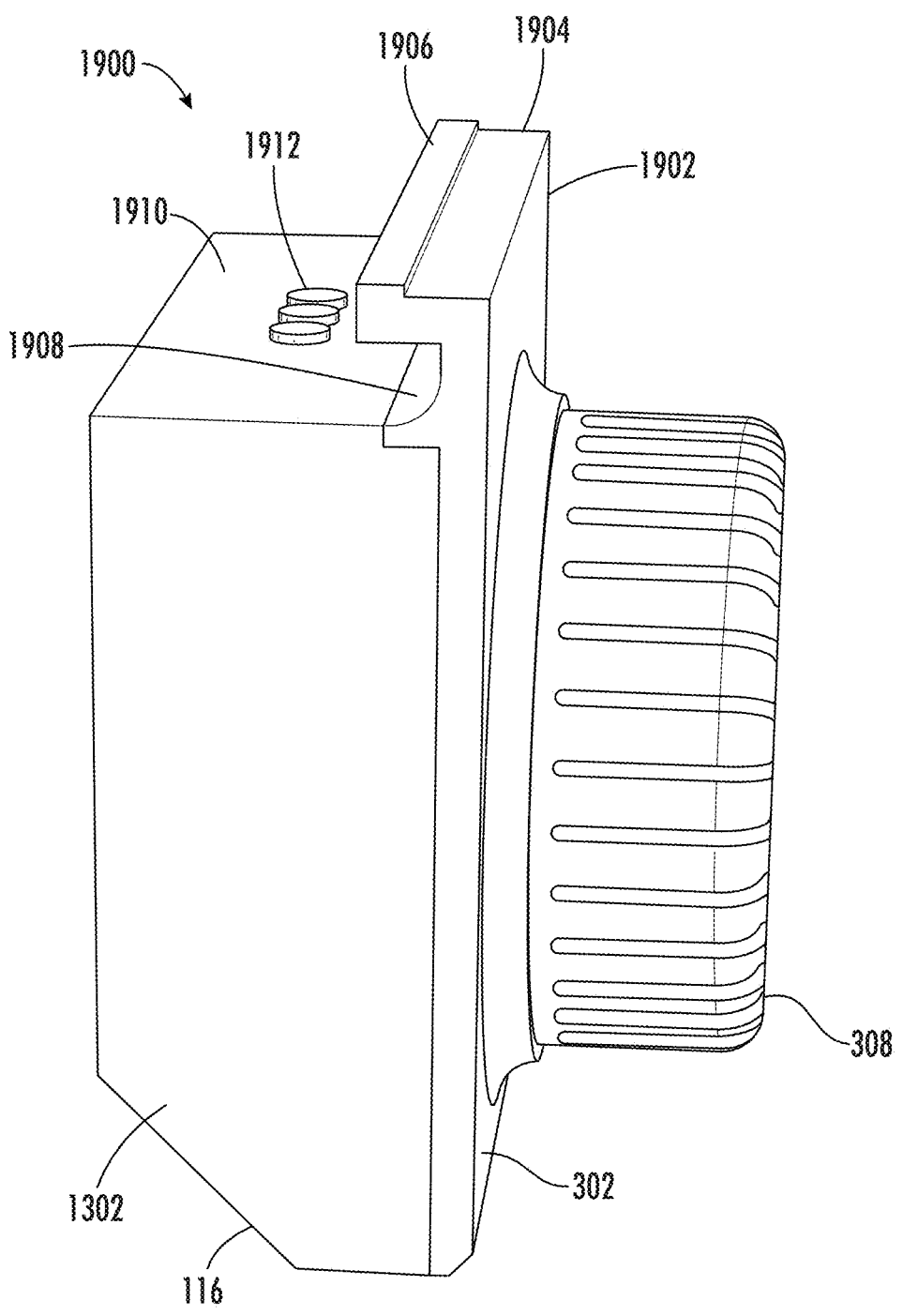
FIG. 19 illustrates an example detail perspective view of a toe-in modular programmable widget.

FIG. 19 illustrates an example detail perspective view 1900 of a toe-in modular programmable widget 116. As shown, an upper portion of the front panel 302 of the modular programmable widget 116 defines a toe-in hook 1902. The toe-in hook 1902 extends upwards above the enclosure 1302 of the modular programmable widget 116, as a continuation of the front face of the modular programmable widget 116. The toe-in hook 1902 then, at its upper extent, extends perpendicularly rearward from the front face as shown by surface 1904. The toe-in hook 1902 further defines a latch 1906 extending upwards from the rear end of the surface 1904. The distance between the front end of the latch 1906 and the front of the toe-in hook 1902 generally may be consistent with the depth of the front panel 1804, such that, when installed, the latch 1906 of the toe-in hook 1902 fits behind the inner face of the front panel 1804, above the slot into the configurable display 114 defined by the track 1802.

The back face 1908 of the toe-in hook 1902 may define a smooth curved surface between the upper surface 1910 of the enclosure 1302 and the vertical rear wall of the toe-in hook 1902. This radius below the surface 1904 may serve to guide the toe-in hook 1902 as the modular programmable widgets 116 is first angled for insertion into the track 1802 as shown by the modular programmable widget 116A in FIG. 18B, and then straightened out to lock into the track 1802 as shown by the three modular programmable widgets 116B-D attached into position in FIG. 18A.

Referring again to FIG. 19, the upper surface 1910 of the enclosure 1302 may further define connecting pins 1912 extending upwards from the upper surface 1910. The connecting pins 1912 may be configured to allow the modular programmable widget 116 to receive power from the configurable display 114 as well as to communicate data between the modular programmable widget 116 and the configurable display 114.

Figure 20:
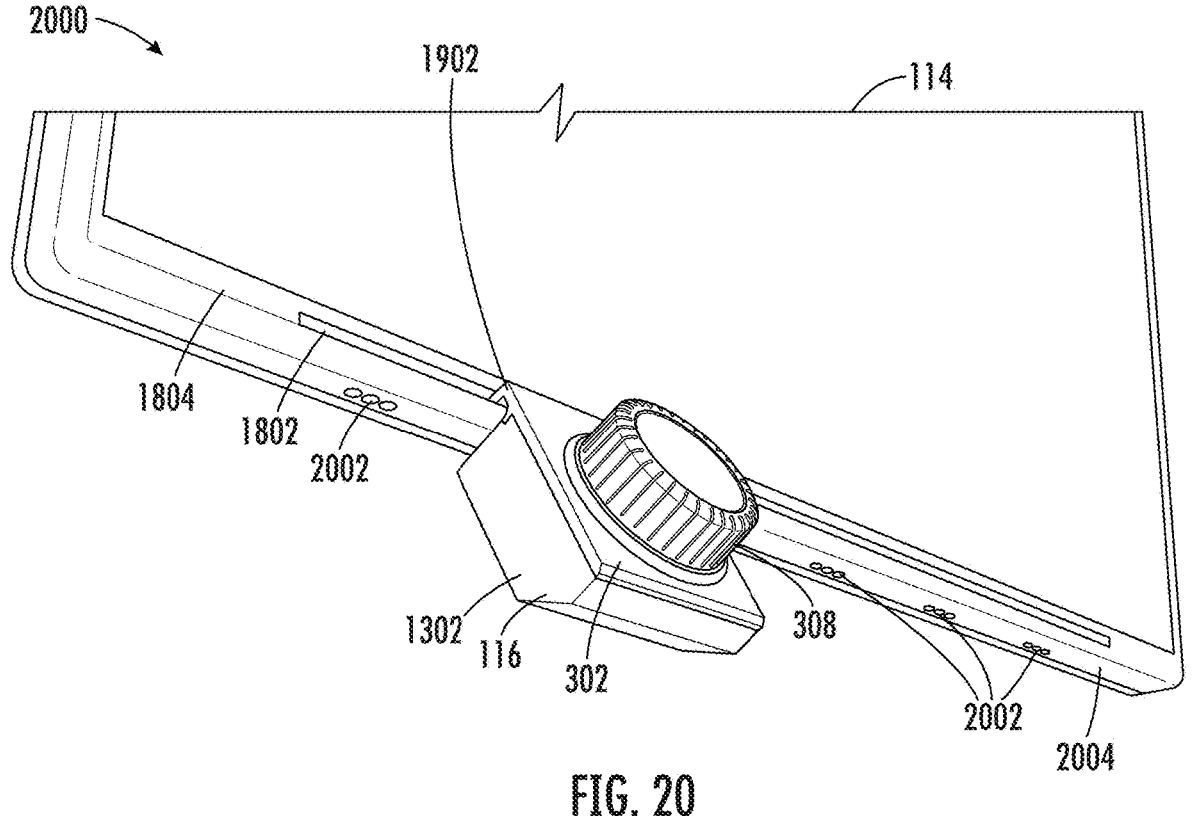
FIG. 20 illustrates an example bottom perspective view of the configurable display illustrating pin connectors defined within a lower surface of the configurable display.

FIG. 20 illustrates an example bottom perspective view 2000 of the configurable display 114 illustrating pin connectors 2002 defined within a lower surface 2004 of the configurable display 114. While not shown, detents and/or internal magnets may be used to aid in alignment of the modular programmable widgets 116 into one of a set of positions, where each position has respective pin connectors 2002 for mating with the connecting pins 1912 of the modular programmable widget 116 when the toe-in hook 1902 is used to secure the modular programmable widget 116 into the track 1802, causing the upper surface 1910 of the modular programmable widget 116 to meet the lower surface 2004 of the configurable display 114.

It should again be noted that the operations illustrated in FIGS. 6-10 may be performed to allow for the configuration of the toe-in modular programmable widgets 116. For instance, the configuration may be initiated responsive to turning into place of the modular programmable widget 116, and the resultant forming of the electrical connection between the connecting pins 1912 and the pin connectors 2002.

Figures 21, 22:
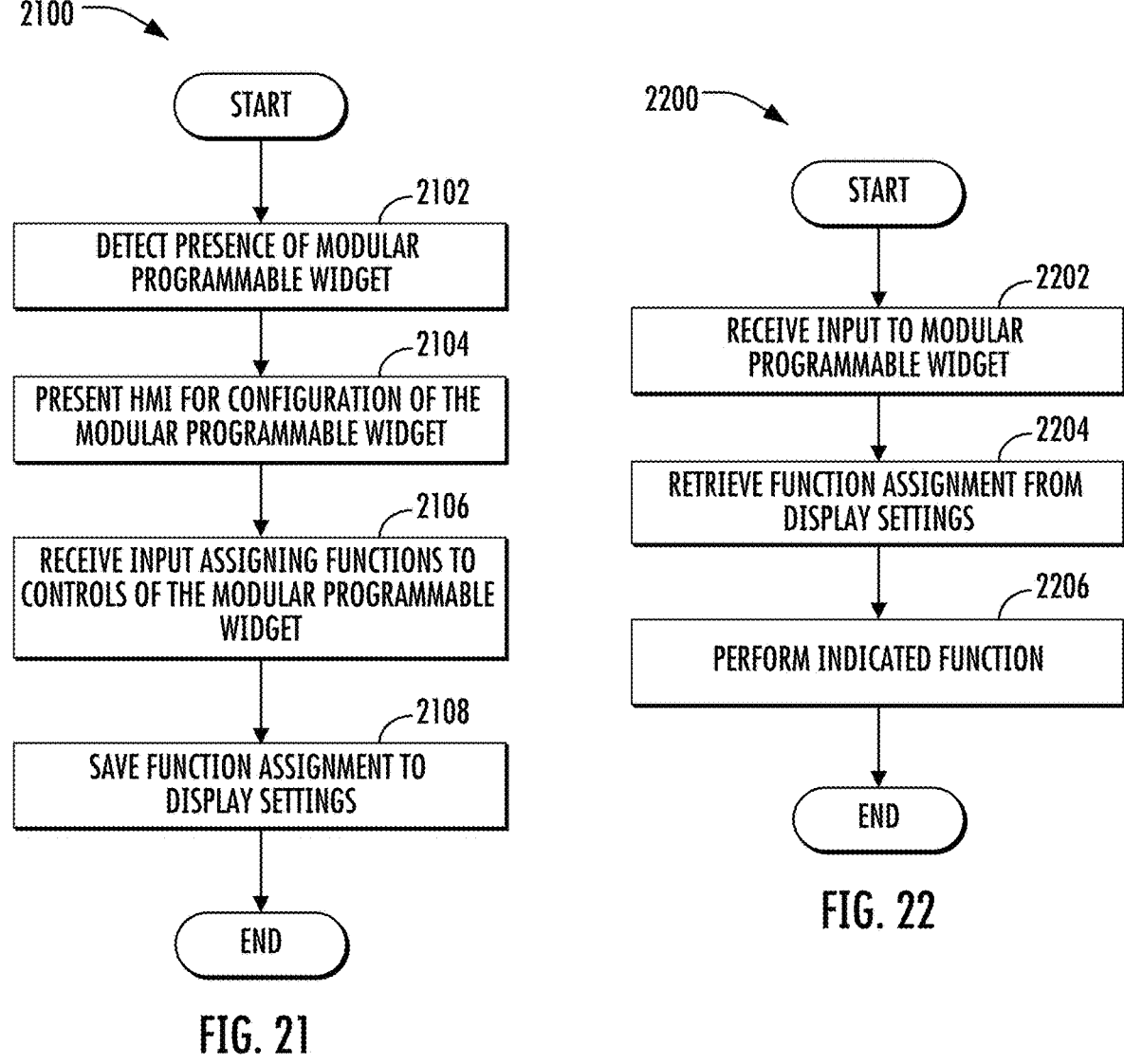
FIG. 21 illustrates an example process for the configuration of a modular programmable widget.
FIG. 22 illustrates an example process for the use of a configured modular programmable widget.

FIG. 21 illustrates an example process 2100 for the configuration of a modular programmable widget 116. In an example, the process 2100 may be performed by the components of the vehicle 102, as discussed in detail herein, when operating in a configuration mode.

At operation 2102, the HMI display system 104 detects the presence of a modular programmable widget 116. In an example, responsive to connection of the modular programmable widget 116 to the configurable display 114, the input controller 112 of the HMI display system 104 may receive signals indicative of the connection. In a first example, the connection may include the electrical connectors 314 of the modular programmable widget 116 being inserted into the connector ports 406 of the configurable display 114. In a second example, the connection may include the electrical contacts 1306 of the modular programmable widget 116 being attached to the electrical connectors 1204 of the tray 1102. In a third example, the connection may include the connecting pins 1602 of the modular programmable widget 116 being slid onto the pin connectors 1702 of the configurable displays 114. In a fourth example, the connection may include the connecting pins 1912 of the modular programmable widget 116 being turned onto the pin connector 2002 of the configurable display 114.

Regardless of example, the modular programmable widget 116 may provide information to the configurable display 114 via the electrical connectors 314 indicative of the type of the modular programmable widget 116. This information may indicate, for example, that the modular programmable widget 116 is an HMI device. The information may further include information such as model of the modular programmable widget 116, color of the modular programmable widget 116, quantity of programmable dials 308, quantity of programmable toggles 312, quantity of programmable switches 1002, quantity of hidden buttons 316 or other controls, etc., which may be used to allow the configurable display 114 to display an image consistent with the modular programmable widget 116 that is attached.

At operation 2104, the HMI display system 104 presents an HMI for the configuration of the modular programmable widget 116. In an example, the main screen area 504 of the configurable display 114 may be changed, by the HMI display system 104, to a screen for the configuration of the modular programmable widget 116. An example of such a screen is shown in FIG. 6.

At operation 2106, the HMI display system 104 receives input assigning functions to controls of the modular programmable widget 116. In an example, as shown in FIG. 7, the HMI display system 104 may present an HMI to receive selection of a control of the modular programmable widget 116. The control may include any of the various controls described herein, such as programmable dials 308, programmable toggles 312, hidden buttons 316, programmable switches 1002, etc. As shown in FIG. 8, the HMI display system 104 may present an HMI to receive selection of a function to assign to the control of the modular programmable widget 116. The functions may include, as some examples, hot keys (e.g., quick selection of menu operations within the menu structure of the vehicle), utility controls (e.g., towing functions), climate control functions (e.g., temperature settings, fan settings, etc.), gig work function (e.g., rideshare commands), media control functions (e.g., volume, station presets, media input selection), smart home settings (e.g., garage door operation, home climate control settings), vehicle settings (e.g., interior lighting settings, gauge cluster display modes), etc.

At operation 2108 the HMI display system 104 saves the function assignment to the display settings 134 in the memory 108. For instance, the modular programmable widget 116 may have a unique identifier, and the display settings 134 may store the unique identifier the modular programmable widget 116, an identifier of the control and a corresponding identifier of the assigned function corresponding to the unique identifier of the modular programmable widget

116 and the identifier of the control. In another example, each control of the modular programmable widget 116 may have a unique identifier, and the display settings 134 may store the unique identifier the control and a corresponding identifier of the assigned function corresponding to the unique identifier of the control. After operation 2108, the process 2100 ends.

FIG. 22 illustrates an example process 2200 for the use of a configured modular programmable widget 116. In an example, as with the process 2100, the process 2200 may be performed by the components of the vehicle 102, as discussed in detail herein, when operating in a runtime mode.

At operation 2202, the HMI display system 104 receives input from a control of a modular programmable widget 116. In an example, a user may press, turn, or otherwise interact with a programmable dial 308, programmable toggle 312, programmable switch 1002, hidden button 316 or other controls of the modular programmable widgets 116 installed to the HMI display system 104. Responsive to receipt of the input, the modular programmable widget 116 may send a message to the configurable display 114 via the electrical connection to the configurable display 114. This message may indicate, for example, an identifier of the modular programmable widget 116 and/or an identifier of the control of the modular programmable widget 116.

At operation 2204, the HMI display system 104 retrieves a function assignment corresponding to the selected control. In an example, the HMI display system 104 may access the memory 108 to identify, from the display settings 134, an identifier of the selected feature corresponding to the identifier of the control and/or the identifier of the modular programmable widget 116. At operation 2206, the HMI display system 104 executes the function identified at operation 2204. After operation 2206, the process 2200 ends.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), random access memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, case of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary. The term "substantially," "generally," or "about" may be used herein and may modify a value or relative characteristic disclosed or claimed. In such instances, "substantially," "generally," or "about" may signify that the value or relative characteristic it modifies is within +0%, 0.1%, 0.5%, 1%, 2%, 3%, 4%, 5% or 10% of the value or relative characteristic (e.g., with respect to degrees of offset from an angle when referring to substantially perpendicular or parallel).

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A modular programmable widget system for a vehicle, comprising:
   a configurable display defining a set of positions in a linear array along a slot of the configurable display, each of the set of positions being configured to receive modular programmable widgets, each position comprising pins configured to provide data and/or power to a connected modular programmable widget, the configurable display comprising internal magnets positioned along the slot aiding in alignment of the connected modular programmable widget into each one of the set of positions; and
   a modular programmable widget comprising
      a generally rectangular enclosure defining a toe-in hook sized to be received into the slot to mechanically secure the modular programmable widget to the configurable display as aligned into one of the set of positions by the internal magnets;
      one or more physical controls extending outwards from the front of the enclosure; and
      an electrical connector exposed at the top of the enclosure to facilitate connection with corresponding electrical connectors of the configurable display.

2. The vehicle system of claim 1, wherein the one or more physical controls include one or more programmable dials configured to receive rotational input.

3. The vehicle system of claim 2, wherein the one or more programmable dials comprise rotary encoders configured to receive rotational input and a center button configured to receive press input.

4. The vehicle system of claim 1, wherein the one or more physical controls include one or more programmable toggles, each toggle comprising two individual button controls configured to receive up or down input.

5. The vehicle system of claim 1, wherein the one or more physical controls include one or more programmable switches configured to receive binary input from a user.

6. The vehicle system of claim 1, wherein the configurable display is a center stack display of the vehicle.

7. The vehicle system of claim 1, wherein the configurable display is a second row display of the vehicle.

8. The vehicle system of claim 1, wherein the toe-in hook extends upwardly and rearwardly from a front of the enclosure and terminates in a latch configured to be received into the slot of a configurable display so as to engage behind an inner face of the configurable display.

9. A modular programmable widget, comprising:
   a generally rectangular enclosure defining a toe-in hook sized to be received into a slot of a configurable display defining a set of positions in a linear array along the slot;
   one or more physical controls extending outwards from the front of the enclosure;

a widget internal magnet mounted within the enclosure; and an electrical connector exposed at the top of the enclosure to facilitate connection with corresponding electrical connectors of a configurable display, wherein the configurable display includes internal magnets to aid in alignment of the modular programmable widget into one of the set of positions.

10. The widget of claim 9, wherein the one or more physical controls include one or more programmable dials configured to receive rotational input.

11. The widget of claim 9, wherein the one or more programmable dials comprise rotary encoders configured to receive rotational input and a center button configured to receive press input.

12. The widget of claim 9, wherein the one or more physical controls include one or more programmable toggles, each toggle comprising two individual button controls configured to receive up or down input.

13. The widget of claim 9, wherein the one or more physical controls include one or more programmable switches configured to receive binary input from a user.

14. The widget of claim 9, wherein an upper portion of the enclosure defines a toe-in hook extending upwards from the enclosure sized to be received into a slot defined by the configurable display.

15. A configurable display for a vehicle, comprising:

a body defining a slot and set of positions arranged in a linear array along the slot, each of the set of positions configured to receive modular programmable widgets, each position comprising pins configured to provide data and/or power to a connected modular programmable widget; and internal magnets within the body, positioned along the slot to aid in magnetic alignment of the connected modular programmable widget into each one of the set of positions, wherein each of the modular programmable widgets defines a toe-in hook sized to be received into the slot to mechanically secure the modular programmable widget to the configurable display as aligned into one of the set positions by the internal magnets.

16. The configurable display of claim 15, wherein the configurable display is a center stack display of the vehicle.

17. The configurable display of claim 15, wherein the configurable display is a second row display of the vehicle.

\* \* \* \* \*